US012779852B2

(12) United States Patent
Nishimura et al.

(10) Patent No.: US 12,779,852 B2
(45) Date of Patent: Nov. 3, 2026

(54) LASER TREATMENT OF PRINTHEAD SURFACES

(71) Applicants: Hiroshi Nishimura, West Hills, CA (US); Giang Vo, Simi Valley, CA (US); Nasser Budraa, La Crescenta, CA (US)

(72) Inventors: Hiroshi Nishimura, West Hills, CA (US); Giang Vo, Simi Valley, CA (US); Nasser Budraa, La Crescenta, CA (US)

(73) Assignee: Ricoh Company, Ltd., Tokyo (JP)

( * ) Notice: Subject to any disclaimer, the term of this patent is extended or adjusted under 35 U.S.C. 154(b) by 190 days.

(21) Appl. No.: 18/605,505

(22) Filed: Mar. 14, 2024

(65) Prior Publication Data

US 2025/0289226 A1 Sep. 18, 2025

(51) Int. Cl.

*B41J 2/16* (2006.01)
*B23K 26/352* (2014.01)
*B41J 2/14* (2006.01)

(52) U.S. Cl.

CPC ........... *B41J 2/1634* (2013.01); *B23K 26/355* (2018.08); *B41J 2/14233* (2013.01);

(Continued)

(58) Field of Classification Search

CPC .... B41J 2/1634; B41J 2/14233; B41J 2/1433; B41J 2/161; B41J 2002/14306;

(Continued)

(56) References Cited

U.S. PATENT DOCUMENTS 8,987,632 B2 3/2015 Wohl, Jr. et al.
2005/0200655 A1* 9/2005 Macler .................. B41J 2/1634 347/45

(Continued)

FOREIGN PATENT DOCUMENTS

EP 0631869 A1 1/1995
EP 882593 A1 12/1998

(Continued)

OTHER PUBLICATIONS

Samanta Avik et al: "Large-area surface wettability patterning of metal alloys via a maskless laser-assisted functionalization method", Applied Surface Science, vol. 568, Aug. 14, 2021 (Aug. 14, 2021).*

(Continued)

*Primary Examiner* — Bradley W Thies
(74) *Attorney, Agent, or Firm* — Duft & Bornsen, PC

(57) ABSTRACT

Laser treatment on surfaces of a printhead. In an embodiment, a printhead comprises an assembly of structural elements each comprising a metal substrate. The structural elements form a plurality of jetting channels and a manifold fluidly coupled to the jetting channels, and the jetting channels and the manifold have internal surfaces internal to the printhead configured to contact a print fluid. The printhead further comprises a laser-altered surface texture formed directly on one or more of the internal surfaces via a laser treatment to define one or more wetting regions on the one or more of the internal surfaces.

19 Claims, 33 Drawing Sheets

(52) U.S. Cl.
CPC ............. *B41J 2/1433* (2013.01); *B41J 2/161* (2013.01); *B41J 2002/14306* (2013.01); *B41J 2002/14419* (2013.01)

(58) Field of Classification Search
CPC .......... B41J 2002/14419; B41J 2202/12; B41J 2202/20; B41J 2/145; B41J 2/1612; B41J 2/162; B41J 2/1623; B41J 2002/14362; B41J 2002/14475; B41J 2/14274; B23K 26/355
See application file for complete search history.

(56) References Cited

U.S. PATENT DOCUMENTS

| | | | |
|---|---|---|---|
| 2008/0158305 | A1 | 7/2008 | Cha et al. |
| 2009/0152236 | A1 | 6/2009 | Ikeda |
| 2011/0298868 | A1 | 12/2011 | Fielder et al. |
| 2017/0072692 | A1 | 3/2017 | Chen et al. |
| 2022/0388308 | A1* | 12/2022 | Nakatani ................ B41J 2/1612 |

FOREIGN PATENT DOCUMENTS

| | | | |
|---|---|---|---|
| EP | 1027988 | B1 | 8/2000 |
| JP | H10264408 | A | 10/1998 |
| JP | 2001130000 | A | 5/2001 |
| JP | 2007106050 | A | 4/2007 |
| JP | 2009184176 | A | 12/2012 |

OTHER PUBLICATIONS

European Search Report; Application EP25162933; 11 pages; Jul. 21, 2025.

Samanta et al; Large-area surface wettability patterning of metal alloys via a maskless laser-assisted functionalization method; Applied Surface Science journal; 10 pages; 2021.

Van Duong Ta et al.; Laser textured superhydrophobic surfaces and their applications for homogeneous spot deposition; Applied Surface Science journal; 7 pages; 2016.

Yong et al.; Chemnonomat ; www.chemnanomat.org; 10.1002/cnma.201800495.

* cited by examiner

LASER TREATMENT OF PRINTHEAD SURFACES

TECHNICAL FIELD

The following disclosure relates to the field of image formation, and in particular, to printheads and/or the design of printheads.

BACKGROUND

Image formation is a procedure whereby a digital image (e.g., a 2D image, a 3D image or model, etc.) is recreated by propelling droplets of ink or another type of print fluid onto a medium, such as paper, plastic, a substrate for 3D printing, etc. Image formation is commonly employed in apparatuses, such as printers (e.g., inkjet printer, 3D printer, etc.), facsimile machines, copying machines, plotting machines, multifunction peripherals, etc. The core of a typical jetting apparatus or image forming apparatus is one or more liquid-droplet ejection heads (referred to generally herein as "printheads") having nozzles that discharge liquid droplets, a mechanism for moving the printhead and/or the medium in relation to one another, and a controller that controls how liquid is discharged from the individual nozzles of the printhead onto the medium in the form of pixels or dots.

A typical printhead includes a plurality of nozzles aligned in one or more rows along a discharge surface of the printhead. Each nozzle is part of a "jetting channel", which includes the nozzle, a pressure chamber, and a diaphragm that vibrates in response to an actuator, such as a piezoelectric actuator. A printhead also includes a driver circuit that controls when each individual jetting channel fires based on image or print data. To jet from a jetting channel, the driver circuit provides one or more jetting pulses to the actuator, which cause the actuator to deform a wall of the pressure chamber (i.e., the diaphragm). The deformation of the pressure chamber creates pressure waves within the pressure chamber that eject one or more droplets of print fluid (e.g., ink) out of the nozzle.

Print quality and/or speed of a printhead may be affected by a variety of factors, such as drying or accumulation of print fluid or other contaminants at or around nozzle discharge orifices, droplet velocity from nozzles, droplet breakup time, etc.

SUMMARY

Embodiments described herein utilize a laser treatment on one or more surfaces of a printhead to improve printhead performance. The laser treatment modifies the material surface (i.e., the actual substrate material, such as stainless steel) to form a desired surface texture, which is referred to herein as a laser-altered surface texture. For example, a laser-altered surface texture may be formed on the discharge surface of a printhead to reduce the wettability of the discharge surface, such as around the nozzle discharge orifices. One technical benefit is accumulation and/or drying of print fluid is reduced or prevented around the nozzle discharge orifices, as buildups or sedimentation around the nozzle discharge orifices may adversely affect the size and/or accuracy of droplets jetted from the nozzles, or may block or clog the nozzles. In another example, a laser-altered surface texture may be formed on one or more internal surfaces of the printhead to increase the wettability of the internal surfaces, such as inner wall surfaces of the pressure chambers, an inner wall surface of the nozzles, etc. One technical benefit is jetting accuracy of the printhead may be improved. Laser-altered surface textures may be used to change other surface properties, as is described in more detail below.

In an embodiment, a printhead comprises an assembly of structural elements each comprising a metal substrate. The structural elements form a plurality of jetting channels and a manifold fluidly coupled to the jetting channels, and the jetting channels and the manifold have internal surfaces internal to the printhead configured to contact a print fluid. The printhead further comprises a laser-altered surface texture formed directly on one or more of the internal surfaces via a laser treatment to define one or more wetting regions on the one or more of the internal surfaces.

In an embodiment, a method comprises obtaining structural elements of a printhead each comprising a metal substrate, applying a laser treatment to one or more of the structural elements to form a laser-altered surface texture directly on one or more inner wall surfaces of the one or more of the structural elements, and assembling the printhead with the structural elements to form a plurality of jetting channels and a manifold fluidly coupled to the jetting channels. The jetting channels and the manifold have internal surfaces internal to the printhead that correspond with the inner wall surfaces of the structural elements. The laser-altered surface texture defines one or more wetting regions on one or more of the internal surfaces configured to contact a print fluid.

In an embodiment, a fabrication tool comprises one or more lasers, a jig configured to support a structural element of a printhead comprising a metal substrate, and a controller configured to control the one or more lasers to apply a laser treatment on one or more inner wall surfaces of the structural element to form a laser-altered surface texture directly on the one or more inner wall surfaces to define a wetting region on the one or more inner wall surfaces configured to contact a print fluid.

The above summary provides a basic understanding of some aspects of the specification. This summary is not an extensive overview of the specification. It is intended to neither identify key or critical elements of the specification nor delineate any scope particular embodiments of the specification, or any scope of the claims. Its sole purpose is to present some concepts of the specification in a simplified form as a prelude to the more detailed description that is presented later.

DESCRIPTION OF THE DRAWINGS

Some embodiments of the present disclosure are now described, by way of example only, and with reference to the accompanying drawings. The same reference number represents the same element or the same type of element on all drawings.

DETAILED DESCRIPTION

The figures and the following description illustrate specific exemplary embodiments. It will thus be appreciated that those skilled in the art will be able to devise various arrangements that, although not explicitly described or shown herein, embody the principles of the embodiments and are included within the scope of the embodiments. Furthermore, any examples described herein are intended to aid in understanding the principles of the embodiments, and are to be construed as being without limitation to such specifically recited examples and conditions. As a result, the inventive concept(s) is not limited to the specific embodiments or examples described below, but by the claims and their equivalents.

Figure 1:
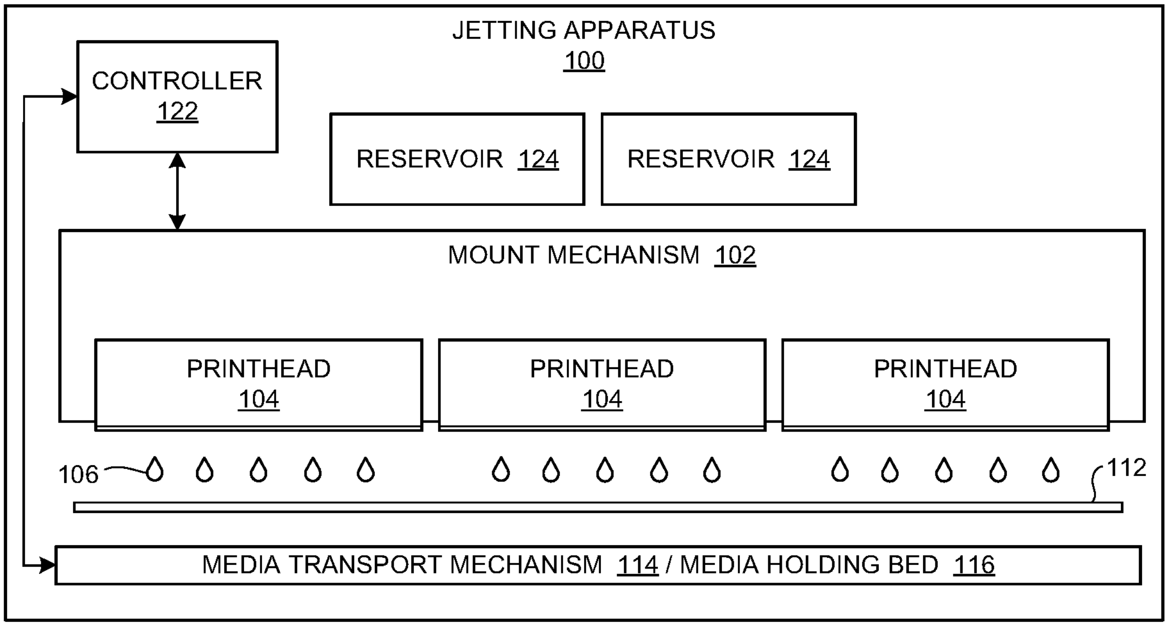
FIG. 1 is a schematic diagram of a jetting apparatus in an illustrative embodiment.

FIG. 1 is a schematic diagram of a jetting apparatus 100 in an illustrative embodiment. A jetting apparatus 100 is an image forming apparatus that uses one or more printheads to eject a print fluid (i.e., a liquid) or jetting fluid onto a medium. One example of jetting apparatus 100 is an inkjet printer (e.g., continuous feed or cutsheet printer) that performs single-pass printing. Other examples of jetting apparatus 100 include a scan pass inkjet printer (e.g., a wide format printer), a multifunction printer, a desktop printer, an industrial or production printer, a 3D printer, etc. Generally, jetting apparatus 100 includes a mount mechanism 102 that supports one or more printheads 104 in relation to a medium 112. Mount mechanism 102 may be fixed within jetting apparatus 100 for single-pass printing. Alternatively, mount mechanism 102 may be disposed on a carriage assembly that reciprocates back and forth along a scan line or sub-scan direction for multi-pass printing. A printhead 104 is a device, apparatus, or component configured to eject droplets 106 of a print fluid, such as ink (e.g., water-based, solvent-based, oil-based, UV-curable, etc.), through a plurality of nozzles (not visible in FIG. 1). The droplets 106 ejected from the nozzles of printheads 104 are directed toward medium 112. Medium 112 comprises any type of material upon which ink or another print fluid is applied by a printhead, such as paper, plastic, card stock, transparent sheets, a substrate for 3D printing, cloth, etc. Typically, nozzles of printheads 104 are arranged in one or more rows so that ejection of a print fluid from the nozzles causes formation of characters, symbols, images, layers of an object, etc., on medium 112 as printhead 104 and/or medium 112 are moved relative to one another. Jetting apparatus 100 may include a media transport mechanism 114 or a media holding bed 116. Media transport mechanism 114 is configured to move medium 112 relative to printheads 104. Media holding bed 116 (e.g., a platen) is configured to support medium 112 in a stationary position while the printheads 104 move in relation to medium 112.

Jetting apparatus 100 also includes a jetting apparatus controller 122 that controls the overall operation of jetting apparatus 100. Jetting apparatus controller 122 may connect to a data source to receive a print job, print data, image data, or the like, and control each printhead 104 to discharge the print fluid onto medium 112. Jetting apparatus 100 also includes one or more reservoirs 124 for a print fluid or multiple types of print fluid. Although not shown in FIG. 1, reservoirs 124 are fluidly coupled to printheads 104, such as with hoses or the like.

Figure 2:
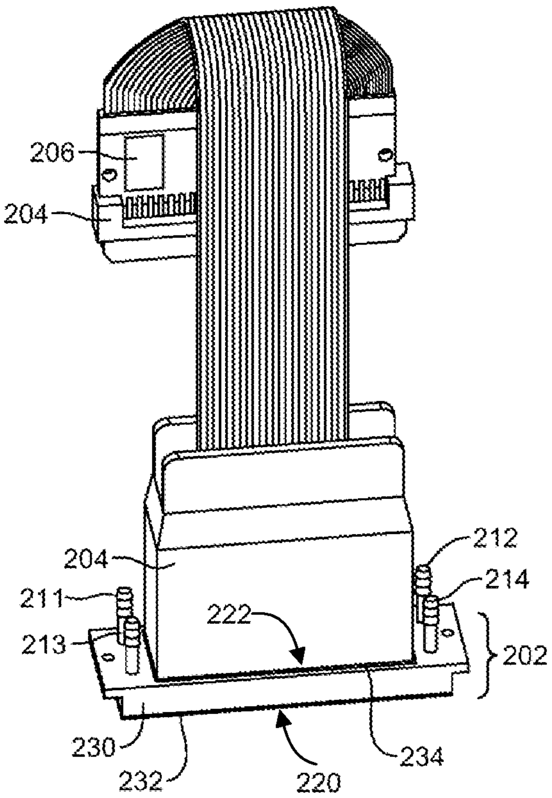
FIG. 2 is a perspective view of a printhead in an illustrative embodiment.

FIG. 2 is a perspective view of a printhead 104 in an illustrative embodiment. FIG. 2 is not drawn to scale. In this embodiment, printhead 104 includes a head member 202 and electronics 204. Head member 202 is an elongated component that forms the jetting channels of printhead 104. A typical jetting channel includes a nozzle, a pressure chamber, and a diaphragm that is driven by an actuator, such as a piezoelectric actuator. Electronics 204 control how the nozzles of printhead 104 jet droplets in response to data signals and control signals received from another controller (e.g., jetting apparatus controller 122). Electronics 204 include an embedded printhead controller 206 or driver circuits configured to drive individual jetting channels based on the data signals and control signals. The bottom surface of head member 202 in FIG. 2 includes the nozzles of the jetting channels, and represents the discharge surface 220 of printhead 104. The top surface of head member 202 in FIG. 2 (referred to as I/O surface 222) represents the Input/Output (I/O) portion for receiving one or more print fluids into printhead 104, and/or conveying print fluids (e.g., fluids that are not jetted) out of printhead 104. I/O surface 222 includes a plurality of I/O ports 211-214. An I/O port 211-214 may comprise an inlet I/O port, which is an opening in head member 202 that acts as an inlet or entry point for a print fluid. An I/O port 211-214 may comprise an outlet I/O port, which is an opening in head member 202 that acts as an outlet or exit point for a print fluid. I/O ports 211-214 may include a hose coupling, hose barb, etc., for coupling with a hose of a reservoir, a cartridge, or the like. The number of I/O ports 211-214 is provided as an example, as printhead 104 may include other numbers of I/O ports.

In general, head member 202 includes a housing 230 and a plate stack 232. Housing 230 is a rigid member made from stainless steel or another type of material. Housing 230 includes an access hole 234 that provides a passageway for electronics 204 to pass through housing 230 so that actuators may interface with (i.e., come into contact with) diaphragms of the jetting channels. Plate stack 232 attaches to an interface surface (not visible) of housing 230. Plate stack 232 (also referred to as a laminate plate stack) is a series of plates that are fixed or bonded to one another to form a laminated stack. Plate stack 232 may include the following plates: one or more nozzle plates, one or more chamber plates, one or more restrictor plates, a support (or support) plate, and a diaphragm plate, although other plates are considered herein, such as a filter plate. A nozzle plate includes a plurality of nozzles that are arranged in one or more rows. A chamber plate includes a plurality of openings that form the pressure chambers of the jetting channels. A restrictor plate includes a plurality of openings that form restrictors to fluidly couple the pressure chambers of the jetting channels with a manifold. A diaphragm plate is a sheet of a semi-flexible material that vibrates in response to actuation by an actuator (e.g., piezoelectric actuator).

FIG. 2 illustrates one particular configuration of a printhead 104, and it is understood that other printhead configurations are considered herein that have a plurality of jetting channels.

Figure 3:
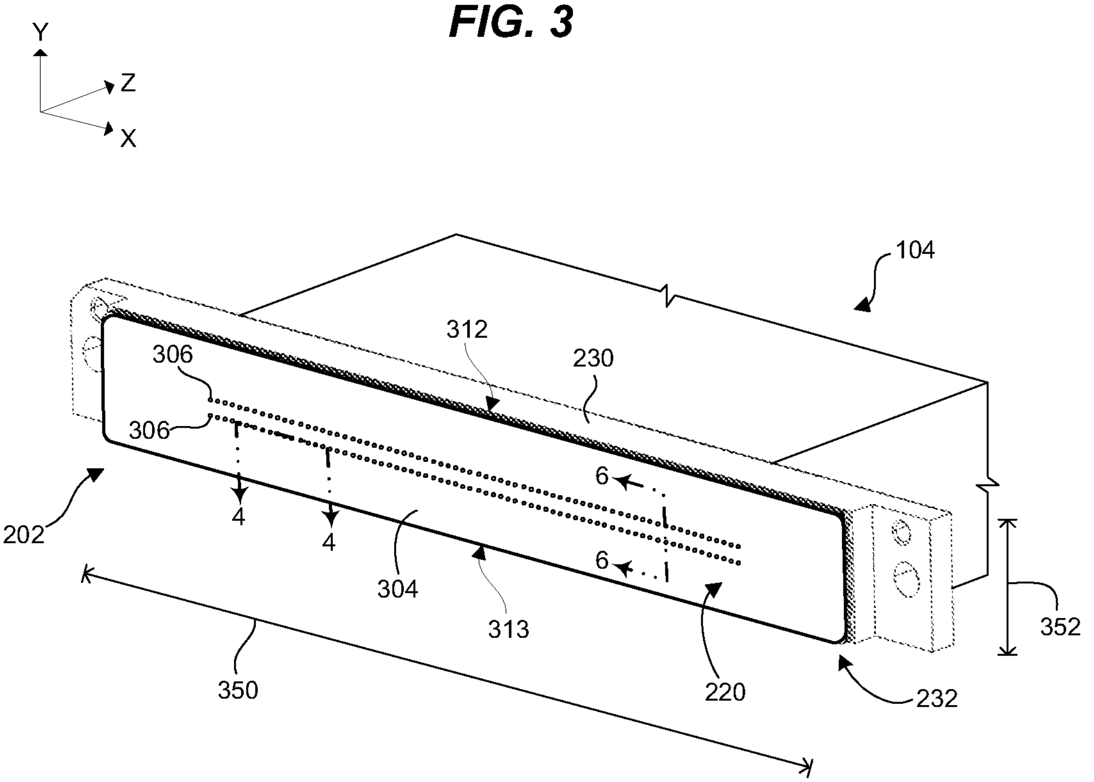
FIG. 3 is a perspective view of a printhead in an illustrative embodiment.

FIG. 3 is a perspective view of a printhead 104 in an illustrative embodiment. FIG. 3 is not drawn to scale. In an embodiment, head member 202 is an assembly of structural elements including housing 230, and plate stack 232 affixed or bonded to housing 230. Plate stack 232 is an elongated stack having a length 350 (i.e., along the x-axis) and a width 352 (i.e., along the y-axis). For this description, the x-axis is along the length 350 of the printhead 104, and may be referred to as the x-direction, the lengthwise direction, the longitudinal direction, etc. The y-axis is along the width 352 of the printhead 104, and may be referred to as the y-direction, the widthwise direction, the transverse direction, etc. The z-axis is along the height of the printhead 104, and may be referred to as the z-direction, the height direction, etc. Plate stack 232 includes one or more nozzle plates 304 that form nozzles 306 of the jetting channels. Thus, the bottom surface of nozzle plate 304 defines the discharge surface 220 of printhead 104. Nozzles 306 are shown in two nozzle rows in FIG. 3 disposed longitudinally along the length 350 of plate stack 232 and generally parallel to longitudinal sides 312-313 of printhead 104/plate stack 232. Although two rows of nozzles 306 are illustrated in FIG. 3, the jetting channels and their corresponding nozzles 306 may be arranged in a single row or more than two rows in other embodiments.

Figure 4:
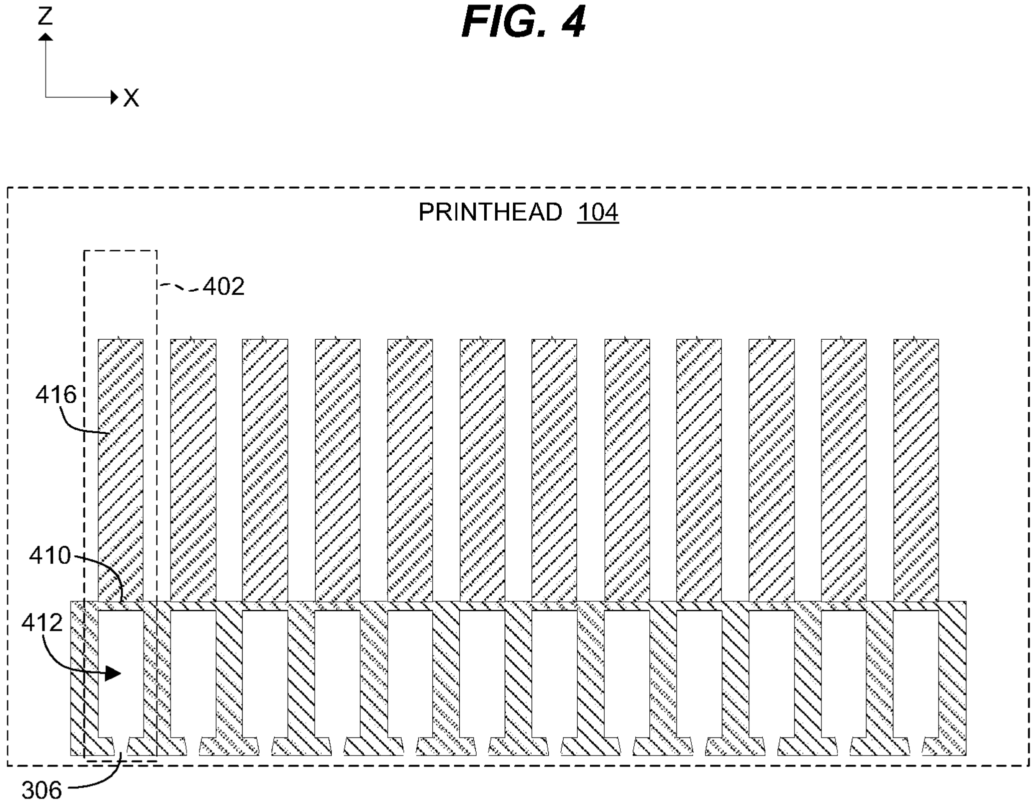
FIG. 4 is a cross-sectional view of a printhead in an illustrative embodiment.

FIG. 4 is a cross-sectional view of a printhead 104 in an illustrative embodiment. FIG. 4 shows a cross-section of a portion of a row of jetting channels 402 along cut-plane 4-4 in FIG. 3. FIG. 4 is not drawn to scale. A jetting channel 402 is a structural element within printhead 104 configured to jet or eject a print fluid. Each jetting channel 402 includes a diaphragm 410, a pressure chamber 412 (also referred to as a Helmholtz chamber), and a nozzle 306. An actuator 416 contacts diaphragm 410 to control jetting from a jetting channel 402. Jetting channels 402 may be formed in rows along the length 350 of printhead 104 (i.e., plate stack 232), and each jetting channel 402 may have a similar configuration as shown in FIG. 4.

Figure 5:
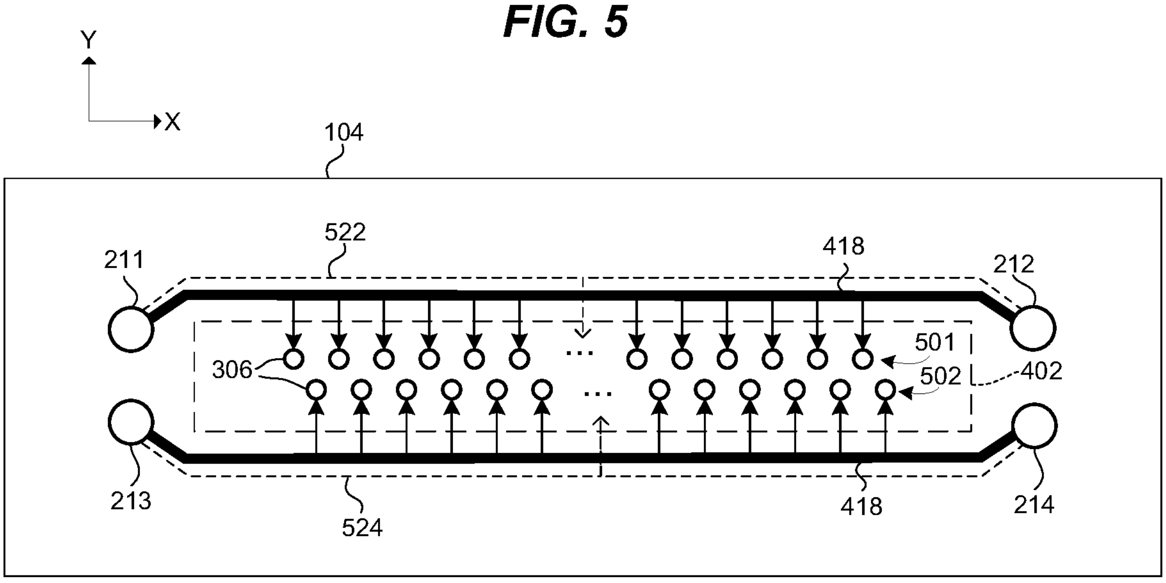
FIG. 5 is a schematic diagram of a printhead in an illustrative embodiment.

FIG. 5 is a schematic diagram of a printhead 104 in an illustrative embodiment. The jetting channels 402 of printhead 104 are schematically illustrated in FIG. 5 as nozzles 306 in two nozzle rows 501-502. Although the nozzles 306 are shown as staggered in FIG. 5, the nozzles 306 in the nozzle rows 501-502 may be aligned in other embodiments. Also, although two nozzle rows 501-502 are illustrated in FIG. 5, printhead 104 may include more or less nozzle rows in other embodiments.

Printhead 104 (i.e., head member 202) includes one or more manifolds 418. A manifold 418 is a conduit or channel internal to printhead 104 (i.e., within the main body or housing 230 of printhead 104) that provides a common fluid path for a plurality of jetting channels 402. A manifold 418 that conveys a print fluid to a plurality of jetting channels 402 may also be referred to as a "supply" manifold. One of the manifolds 418 comprises or defines a fluid path 522 between I/O ports 211-212 and the jetting channels 402 in nozzle row 501. A manifold 418 that conveys a print fluid to jetting channels 402 may be considered as having a direct fluid coupling with the jetting channels 402, as the manifold 418 is fluidly coupled through a restrictor or similar element that controls the flow of the print fluid from manifold 418 to a jetting channel 402. Another one of the manifolds 418 comprises or defines a fluid path 524 between I/O ports 213-214 and the jetting channels 402 in nozzle row 502. The major portions or sections of manifolds 418 are disposed longitudinally within printhead 104 to fluidly couple with the jetting channels 402. Although two manifolds 418 are illustrated in FIG. 5, a printhead 104 may include more or less manifolds as desired. FIG. 5 illustrates a non-flow-through type of printhead 104 merely as an example, and printhead 104 may comprise a flow-through type of head in other embodiments (i.e., more than one manifold 418 fluidly coupled to a row of jetting channels 402 to allow for circulation of print fluid through the jetting channels 402).

Figure 6:
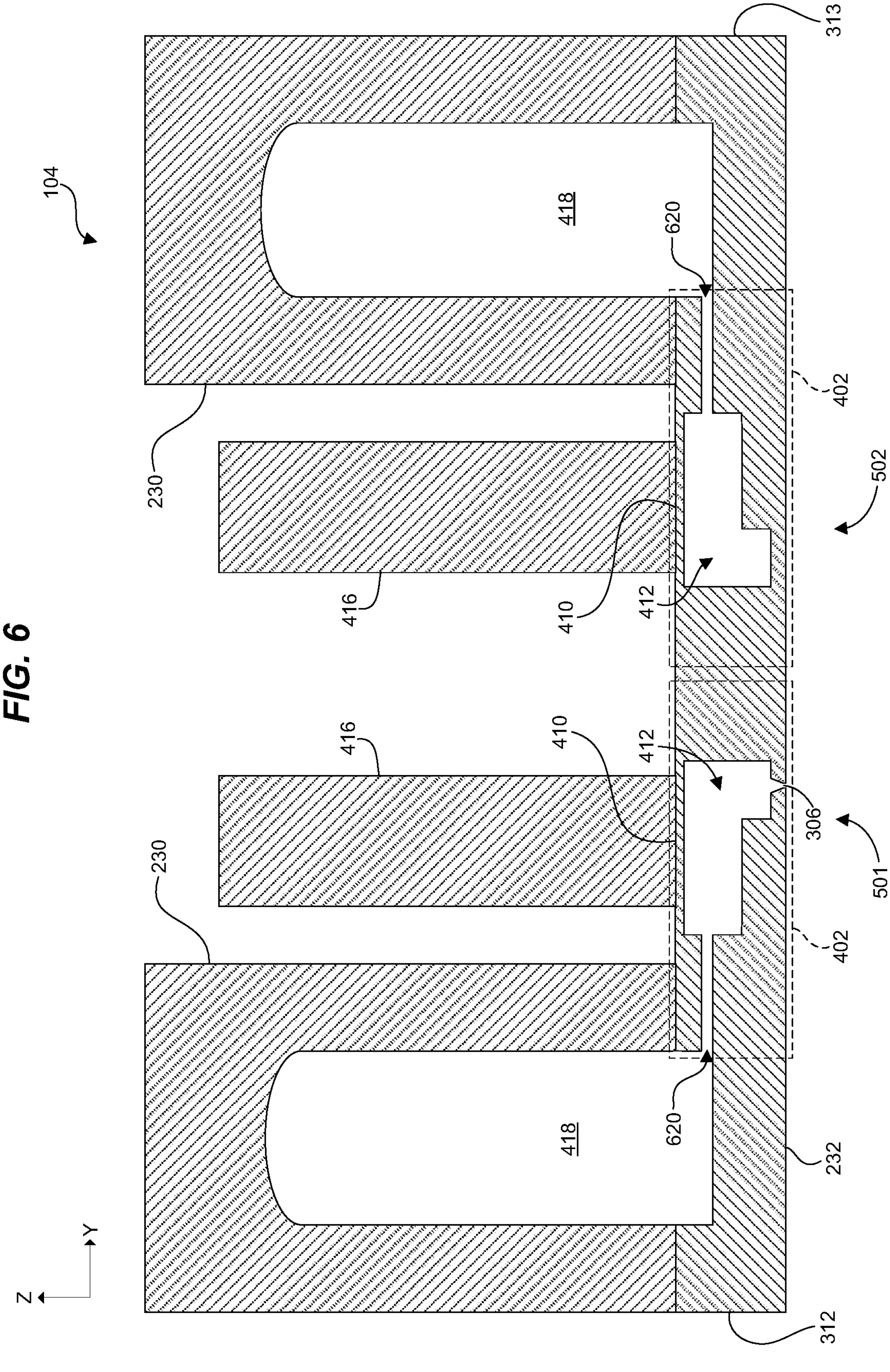
FIG. 6 is a cross-sectional view of a printhead in an illustrative embodiment.

FIG. 6 is a cross-sectional view of a printhead 104 in an illustrative embodiment. FIG. 6 shows a cross-section of printhead 104 along cut-plane 6-6 in FIG. 3. FIG. 6 is not drawn to scale. Two jetting channels 402 are shown in adjacent rows 501-502. As in FIG. 4, a jetting channel 402 includes diaphragm 410, pressure chamber 412, and nozzle 306 (it is noted that the nozzle 306 of the jetting channel 402 in row 502 is not visible in this cross-section). One of the manifolds 418 (i.e., the lefthand side manifold) of printhead 104 is fluidly coupled to jetting channels 402 of row 501. More particularly, the pressure chamber 412 of a jetting channel 402 in row 501 is fluidly coupled to manifold 418 through a channel fluid passage 620. In an embodiment, the channel fluid passage 620 may include/comprise a restrictor that controls or regulates a flow of print fluid between manifold 418 and pressure chamber 412 along channel fluid passage 620. Another one of the manifolds 418 (i.e., the righthand side manifold) of printhead 104 is fluidly coupled to jetting channels 402 of row 502. More particularly, the pressure chamber 412 of a jetting channel 402 in row 502 is fluidly coupled to manifold 418 through a channel fluid passage 620. In an embodiment, the channel fluid passage 620 may include/comprise a restrictor that controls a flow of print fluid between manifold 418 and pressure chamber 412 along channel fluid passage 620.

When in operation, a print fluid flows from a manifold 418 and into a pressure chamber 412 through a channel fluid passage 620. One wall of the pressure chamber 412 is formed with a diaphragm 410 that physically interfaces with an actuator 416. Diaphragm 410 may comprise a sheet of semi-flexible material that vibrates in response to actuation by actuator 416. To jet from a jetting channel 402, one or more jetting pulses are sent to actuator 416, which actuates or "fires" in response to the jetting pulses. Firing of actuator 416 creates pressure waves in pressure chamber 412 that cause jetting of one or more droplets from nozzle 306.

Figure 7:
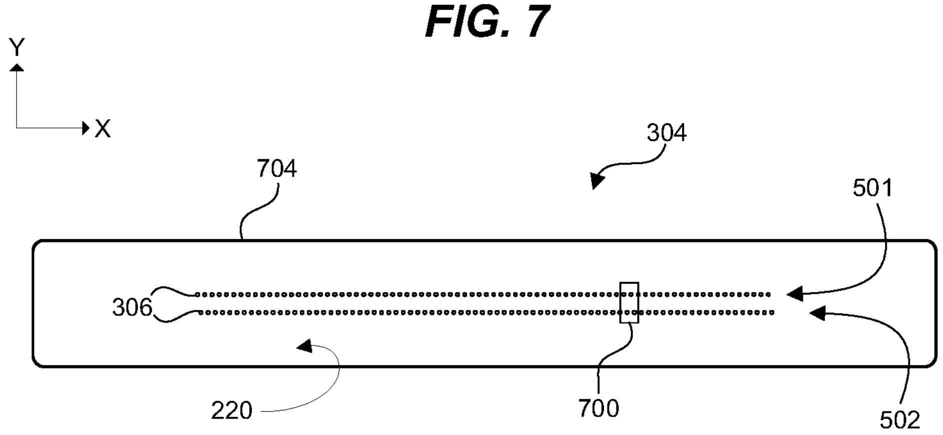
FIG. 7 is a plan view of a nozzle plate in an illustrative embodiment.

FIG. 7 is a plan view of a nozzle plate 304 in an illustrative embodiment. The view in FIG. 7 is of the discharge surface 220 of nozzle plate 304. FIG. 7 is not drawn to scale. Nozzle plate 304 (also referred to as an inkjet nozzle plate) controls the formation and/or distribution of the droplets of print fluid (e.g., ink). Nozzle plate 304 comprises a metal substrate 704, which is a thin layer or sheet of metal material (e.g., stainless steel, nickel, brass, copper, aluminum, etc.) that is generally rectangular in shape and is substantially flat or planar. Nozzle plate 304 further comprises apertures or nozzle holes disposed through the metal substrate 704 that form at least a portion of the nozzles 306 (also referred to as printhead nozzles) of the jetting channels 402. In this example, one group of nozzles 306 is generally aligned longitudinally in a first row 501, and another group of nozzles 306 is generally aligned longitudinally in a second row 502.

Figure 8:
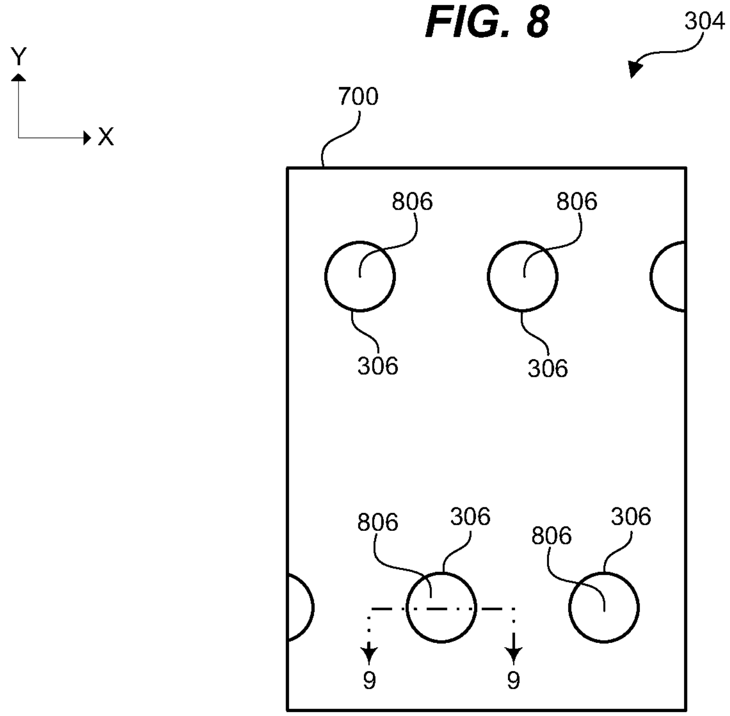
FIG. 8 is a magnified view of a nozzle plate in an illustrative embodiment.
Figure 9:
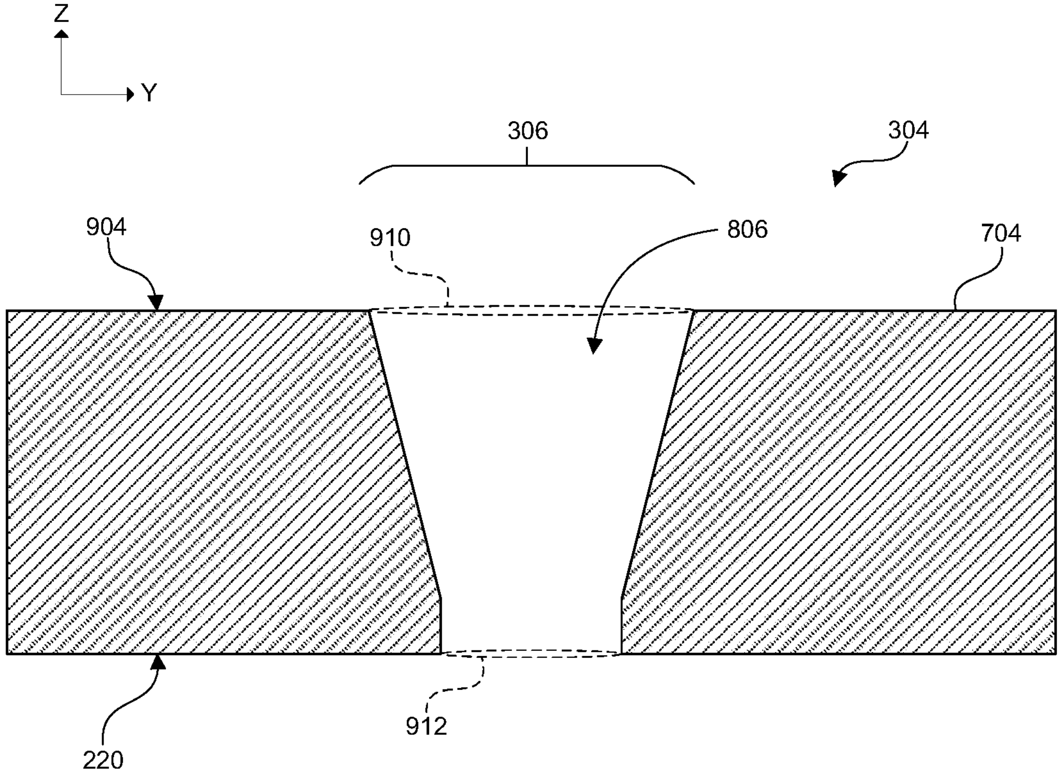
FIG. 9 is a cross-sectional view of a nozzle plate in an illustrative embodiment.

FIG. 8 is a magnified view of nozzle plate 304 in an illustrative embodiment. The view in FIG. 8 is of magnification window 700 in FIG. 7. FIG. 8 is not drawn to scale. A nozzle 306 is defined at least partially by a nozzle hole 806 disposed through nozzle plate 304 (i.e., through the metal substrate 704). FIG. 9 is a cross-sectional view of nozzle plate 304 in an illustrative embodiment. FIG. 9 shows a cross-section of a nozzle plate 304 along cut-plane 9-9 in FIG. 8. FIG. 9 is not drawn to scale. A nozzle 306 is formed at least partially by a nozzle hole 806 in nozzle plate 304. Metal substrate 704 of nozzle plate 304 includes an interface surface 904 (also referred to as a first surface) and an opposing discharge surface 220 (also referred to as a second surface). Interface surface 904 represents an internal surface of an assembled printhead that abuts another plate in a plate stack 232. Discharge surface 220 represents an external surface of an assembled printhead from which a droplet of print fluid is ejected or jetted. Nozzle hole 806 is disposed through metal substrate 704 from interface surface 904 to discharge surface 220. One end of nozzle hole 806 is toward a higher-pressure region within a printhead (e.g., a pressure chamber), and is the entrance or mouth 910 where a print fluid enters the nozzle hole 806. The other end of nozzle hole 806 is toward a lower-pressure region outside of the printhead (e.g., ambient air), and is the nozzle discharge orifice 912 where the print fluid exits or is discharged from the nozzle hole 806. Thus, nozzle hole 806 at discharge surface 220 defines the nozzle discharge orifice 912 of a nozzle 306. Other nozzles 306 may have a similar configuration as shown in FIG. 9.

The nozzle discharge orifice 912 may have a circular shape as illustrated in FIG. 8, although other shapes are considered herein. The shape of nozzle 306 shown in FIG. 9 is an example of a converging nozzle, although other shaped nozzles are considered herein. Also, a single nozzle plate 304 is shown in FIG. 9, where the nozzle hole 806 of the single nozzle plate 304 forms a nozzle 306 (i.e., forms the entirety of the nozzle 306). Alternatively, a plurality of nozzle plates 304 may be stacked together to form a nozzle 306.

Embodiments described herein provide for surface modification or surface treatment of one or more surfaces of a printhead to promote accurate jetting, improved print quality, and/or fabrication quality. In one example, surface modification or surface treatment may be applied to components of an unassembled or an assembled printhead to change the wetting and/or non-wetting characteristics of certain surfaces. In general, wetting is the ability of a liquid to maintain contact with a solid surface, resulting from intermolecular interactions when the two are brought together. The degree of wetting (wettability) is determined by a force balance between adhesive and cohesive forces. Adhesive forces between a liquid and solid cause a liquid drop to spread across the surface of the solid. Cohesive forces within the liquid cause the drop to bead up and avoid contact with the surface of the solid. Wetting, and the surface forces that control wetting, are also responsible for other related effects, including fluid flow and capillary effects.

The wettability of a surface may be defined by its static water contact angle (0). The contact angle is determined by the balance between adhesive and cohesive forces. As the tendency of a drop to spread out over a flat, solid surface increases, the contact angle decreases. Thus, the contact angle provides an inverse measure of wettability. A contact angle less than 900 (low contact angle) usually indicates that wetting of the surface is very favorable, and the fluid will spread over a large area of the surface. A contact angle greater than 90° (high contact angle) generally means that wetting of the surface is unfavorable, so the fluid will minimize contact with the surface and form a compact liquid bead.

Surfaces of a printhead may be defined by their hydrophobicity and hydrophilicity. A hydrophobic surface is a water repelling, low surface energy surface that resists wetting. Contact angle measurements may classify a surface as hydrophobic when the contact angle exceeds 90°. When the contact angle exceeds 150°, the surface may be classified as "superhydrophobic" or having superhydrophobic characteristics. A hydrophilic surface is a water attracting, high surface energy surface that allows for wetting of the surface. Contact angle measurements may classify a surface as hydrophilic when the contact angle is less than 90°. When the contact angle is approximately 0°, the surface may be classified as "superhydrophilic" or having superhydrophilic characteristics.

Figure 10:
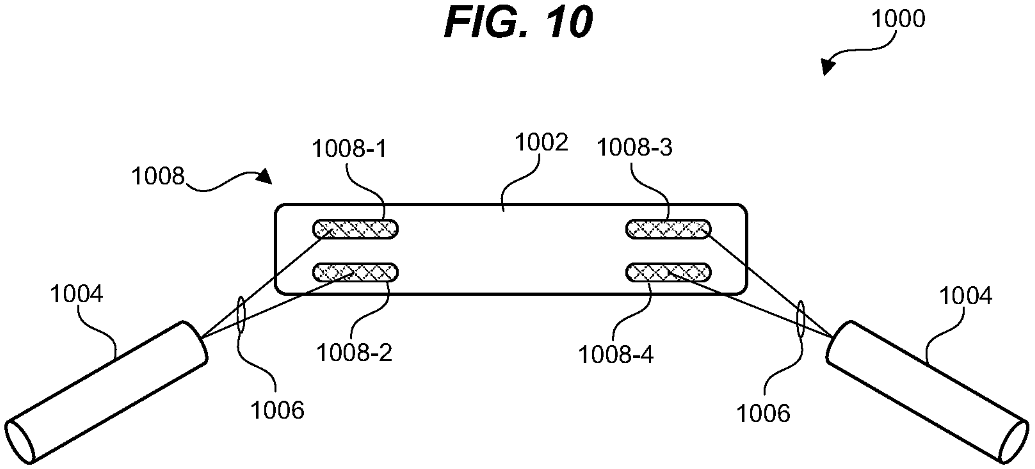
FIG. 10 is a diagram illustrating a laser treatment on a surface of a printhead in an illustrative embodiment.

Hydrophobic and/or hydrophilic surfaces may be attained through various manufacturing or fabrication methods. In embodiments described herein, laser treatment may be applied to one or more surfaces of a printhead by irradiating the surface(s) with one or more laser beams. FIG. 10 is a diagram illustrating a laser treatment 1000 on a surface of a printhead 104 in an illustrative embodiment. Surface 1002 represents a general surface of an unassembled or an assembled printhead. A laser 1004 (or multiple lasers) irradiates at least a portion of surface 1002 with one or more laser beams 1006 to ablate, alter, or modify the surface 1002. This laser treatment process may also be referred to as laser surface texturing, which is a process that alters the surface properties or characteristics of a material. The laser ablation, for example, changes the surface properties of surface 1002 to create a surface texture, a surface topology, and/or a surface roughness (referred to herein as a laser-altered surface texture 1008) directly on the surface 1002. For example, the laser beam(s) 1006 may create three-dimensional (3D) patterns or motifs (e.g., micropatterns or nanopatterns) on surface 1002 through laser ablation, removing layers of material with micrometer or nanometer precision. The laser-altered surface texture 1008 therefore comprises a pattern of local deviations in the surface material created by application of the laser beam(s) 1006. The patterns may include posts, tubules, dimples, grooves, and/or other forms. A laser treatment 1000 may be used to increase or change the hydrophobic properties of surface 1002, to increase or change the hydrophilic properties of surface 1002, and/or to change or alter other properties of surface 1002. Thus, a pattern (or set of patterns) for a laser-altered surface texture 1008-1 may increase the hydrophobic properties of surface 1002, and a different pattern (or set of patterns) for a laser-altered surface texture 1008-2 may increase the hydrophilic properties of surface 1002. Also, a pattern (or set of patterns) for a laser-altered surface texture 1008-3 may increase ultraviolet (UV) absorption properties of surface 1002, and a pattern (or set of patterns) for a laser-altered surface texture 1008-4 may increase adhesion properties of surface 1002. However, other types of patterns are considered herein. Also, some patterns may change hydrophobic properties or hydrophilic properties, while also changing other properties, such as UV absorption properties, adhesion properties, etc.

In an embodiment, laser treatment 1000 may be applied to one or more external or exterior surfaces of a printhead. For example, laser treatment 1000 may be applied to the discharge surface 220 of a nozzle plate 304 to selectively change the hydrophobic properties, hydrophilic properties, and/or other properties of the discharge surface 220.

Figure 11:
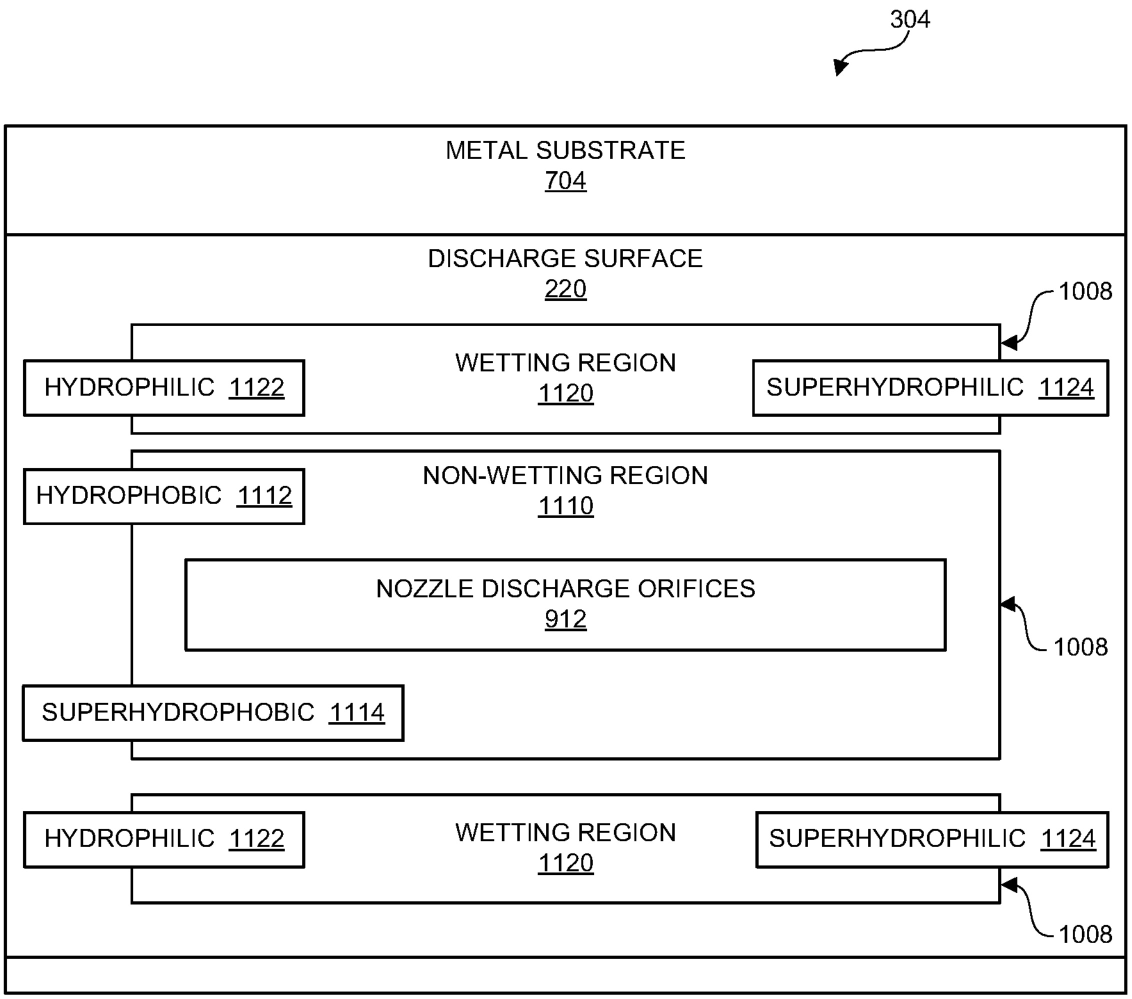
FIG. 11 is a block diagram of a nozzle plate in an illustrative embodiment.

FIG. 11 is a block diagram of a nozzle plate 304 in an illustrative embodiment. As described above, nozzle plate 304 comprises a metal substrate 704, and one of the surfaces of the nozzle plate 304 comprises the discharge surface 220. In an embodiment, one or more laser-altered surface textures 1008 may be formed directly on the discharge surface 220 of the metal substrate 704 via a laser treatment 1000. A laser-altered surface texture 1008 may define one or more non-wetting regions 1110 on the discharge surface 220, and/or may define one or more wetting regions 1120 on the discharge surface 220. A non-wetting region 1110 (also referred to as an anti-wetting region) comprises an area or areas on a surface where the contact angle of a liquid (e.g., an aqueous ink, oil-based ink, etc.) is greater than about 90°. A wetting region 1120 comprises an area or areas on a surface where the contact angle of a liquid is less than about 90°. One type or 3D pattern of a laser-altered surface texture 1008 (i.e., a first laser-altered surface texture 1008-1) may define a non-wetting region 1110, and a different type or 3D pattern of a laser-altered surface texture 1008 (i.e., a second laser-altered surface texture 1008-2) may define a wetting region 1120. One technical benefit is the laser treatment 1000 alters the actual material surface of the metal substrate 704 in defining the non-wetting regions 1110 and/or the wetting regions 1120, so these regions are not as susceptible to wear or degradation as compared to coatings and the like.

Non-wetting region 1110 has increased hydrophobic properties 1112 compared to the material of metal substrate 704 due to the laser-altered surface texture 1008. In some embodiments, non-wetting region 1110 may have superhydrophobic properties 1114. Likewise, wetting region 1120 has increased hydrophilic properties 1122 compared to the material of metal substrate 704 due to the laser-altered surface texture 1008. In some embodiments, wetting region 1120 may have superhydrophilic properties 1124.

In an embodiment, a non-wetting region 1110 may be formed on the discharge surface 220 around, surrounding, or proximate to the nozzle discharge orifices 912. One technical benefit is the non-wetting region 1110 resists accumulation and drying of ink, for example, around the nozzle discharge orifices 912. In an embodiment, a non-wetting region 1110 and a wetting region 1120 may be formed on the discharge surface 220, with the non-wetting region 1110 separating the nozzle discharge orifices 912 from the wetting region 1120. One technical benefit is ink, for example, which may bead on the non-wetting region 1110, collects in an adjacent wetting region 1120 where any accumulation is distant from the nozzle discharge orifices 912. The two-dimensional (2D) layout of the non-wetting region(s) 1110 and/or the wetting region(s) 1120 on discharge surface 220 may vary as desired.

Figure 12A:
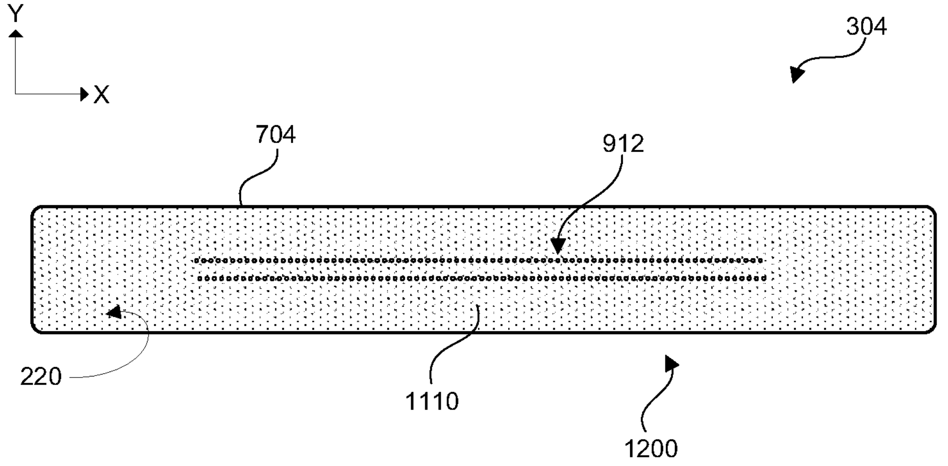
FIGS. 12A-12C show 2D layouts of a non-wetting region (s) and/or a wetting region(s) on a nozzle plate in illustrative embodiments.
Figure 12B:
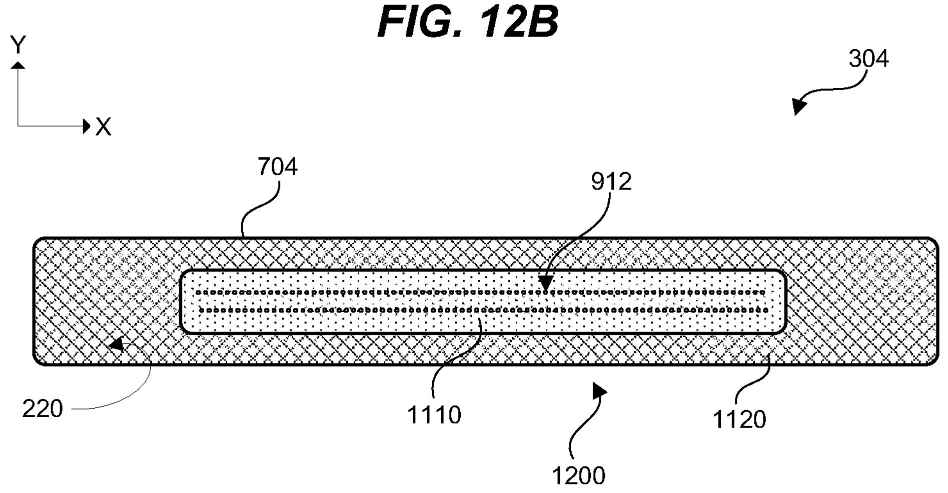
Figure 12C:
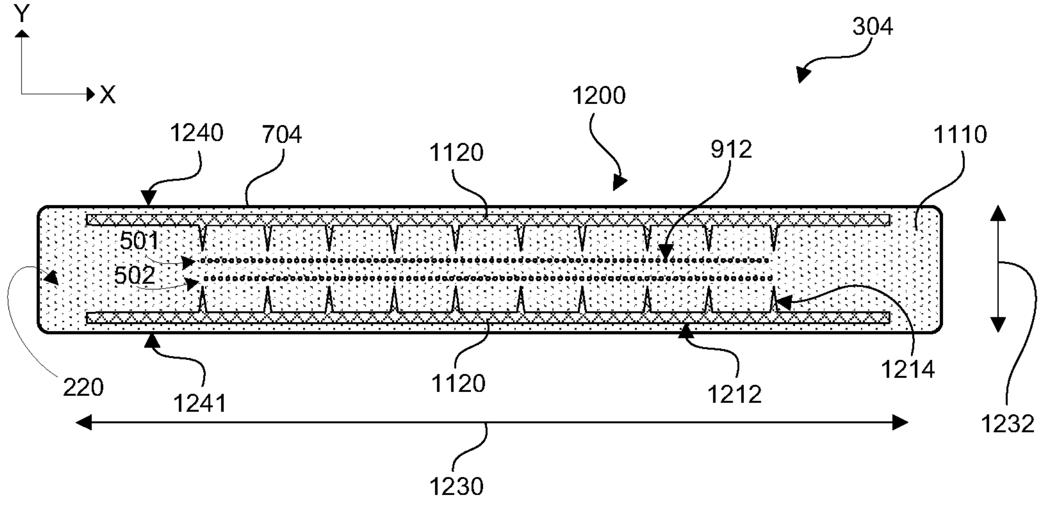

FIGS. 12A-12C show 2D layouts 1200 of a non-wetting region(s) 1110 and/or a wetting region(s) 1120 on a nozzle plate 304 in illustrative embodiments. FIGS. 12A-12C are plan views of a nozzle plate 304 showing the discharge surface 220. FIGS. 12A-12C are not drawn to scale. In FIG. 12A, a laser-altered surface texture 1008 defines a non-wetting region 1110 over a surface area (e.g., a total surface area) of the discharge surface 220. One technical benefit is the non-wetting region 1110 resists accumulation and drying of ink, for example, around the nozzle discharge orifices 912.

Figure 13:
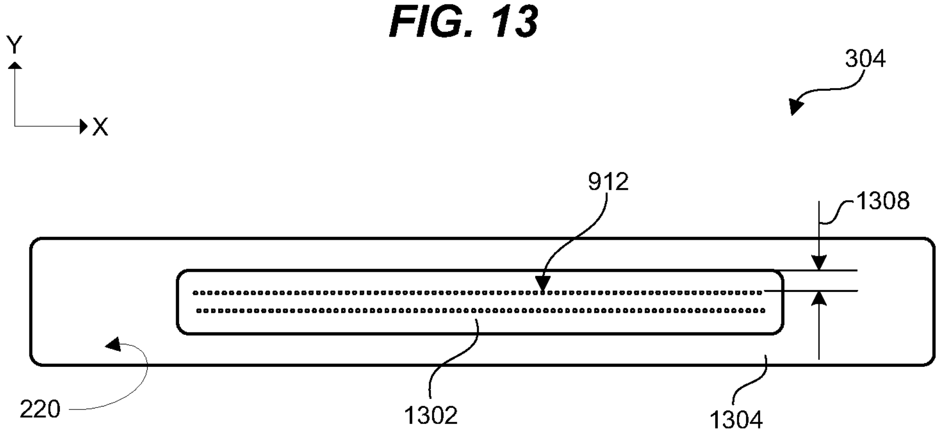
FIG. 13 is a plan view of a nozzle plate showing a discharge surface in an illustrative embodiment.

In FIG. 12B, a combination of a non-wetting region 1110 and a wetting region 1120 is formed on discharge surface 220. The non-wetting region 1110 surrounds the nozzle discharge orifices 912, and separates the nozzle discharge orifices 912 from the wetting region 1120. Thus, the wetting region 1120 is disposed at least a predetermined distance from the nozzle discharge orifices 912. FIG. 13 is a plan view of a nozzle plate 304 showing the discharge surface 220 in an illustrative embodiment. FIG. 13 is not drawn to scale. Nozzle plate 304 includes a functional or jetting zone 1302 and a non-functional or non-jetting zone 1304. The jetting zone 1302 (i.e., zone where a print fluid is discharged) is defined as an area on the discharge surface 220 around the nozzle discharge orifices 912. The jetting zone 1302 may be defined such that each point in the jetting zone 1302 is within a predetermined distance 1308 from a nozzle discharge orifice 912. The non-jetting zone 1304 is defined as an area on the discharge surface 220 around the jetting zone 1302 distant from the nozzle discharge orifices 912. The non-jetting zone 1304 may be defined such that each point in the non-jetting zone 1304 is outside the predetermined distance 1308 from a nozzle discharge orifice 912. In FIG. 12B, non-wetting region 1110 may be disposed in the jetting zone 1302 (i.e., within the predetermined distance 1308 to the nozzle discharge orifices 912), while wetting region 1120 may be disposed in the non-jetting zone 1304

(i.e., at least the predetermined distance 1308 from the nozzle discharge orifices 912). One technical benefit is ink, for example, which may bead on the non-wetting region 1110 proximate to the nozzle discharge orifices 912, collects in an adjacent wetting region 1120 where any accumulation is distant from the nozzle discharge orifices 912.

In FIG. 12C, a combination of a non-wetting region 1110 and wetting regions 1120 is formed on discharge surface 220. The nozzle discharge orifices 912 are disposed in one or more rows in a longitudinal direction 1230 of nozzle plate 304 (i.e., corresponding with rows 501-502) between opposing longitudinal sides 1240-1241 of nozzle plate 304. A non-wetting region 1110 surrounds the nozzle discharge orifices 912. A wetting region 1120 includes at least a longitudinal segment 1212 disposed generally in the longitudinal direction 1230 between a row 501-502 and a longitudinal side 1240-1241 (and generally parallel to a row 501-502). A wetting region 1120 further includes a plurality of strip segments 1214 disposed at an angle from the longitudinal segment 1212 toward a row 501-502 of the nozzle discharge orifices 912. For example, the strip segments 1214 may be generally in the transverse direction 1232, and extend from a longitudinal segment 1212 towards a row 501-502 of the nozzle discharge orifices 912. In an embodiment, the strip segments 1214 may decrease in width from the longitudinal segment 1212 toward a row 501-502 of the nozzle discharge orifices 912, however other shapes or dimensions are considered herein. One technical benefit is ink, for example, which may bead on the non-wetting region 1110 proximate to the nozzle discharge orifices 912, collects in an adjacent wetting region 1120 where any accumulation is distant from the nozzle discharge orifices 912. The longitudinal segment 1212 acts as a collection area for ink, while the strip segments 1214 act as fluid channels to convey ink from the non-wetting region 1110 to the collection area.

Figure 14:
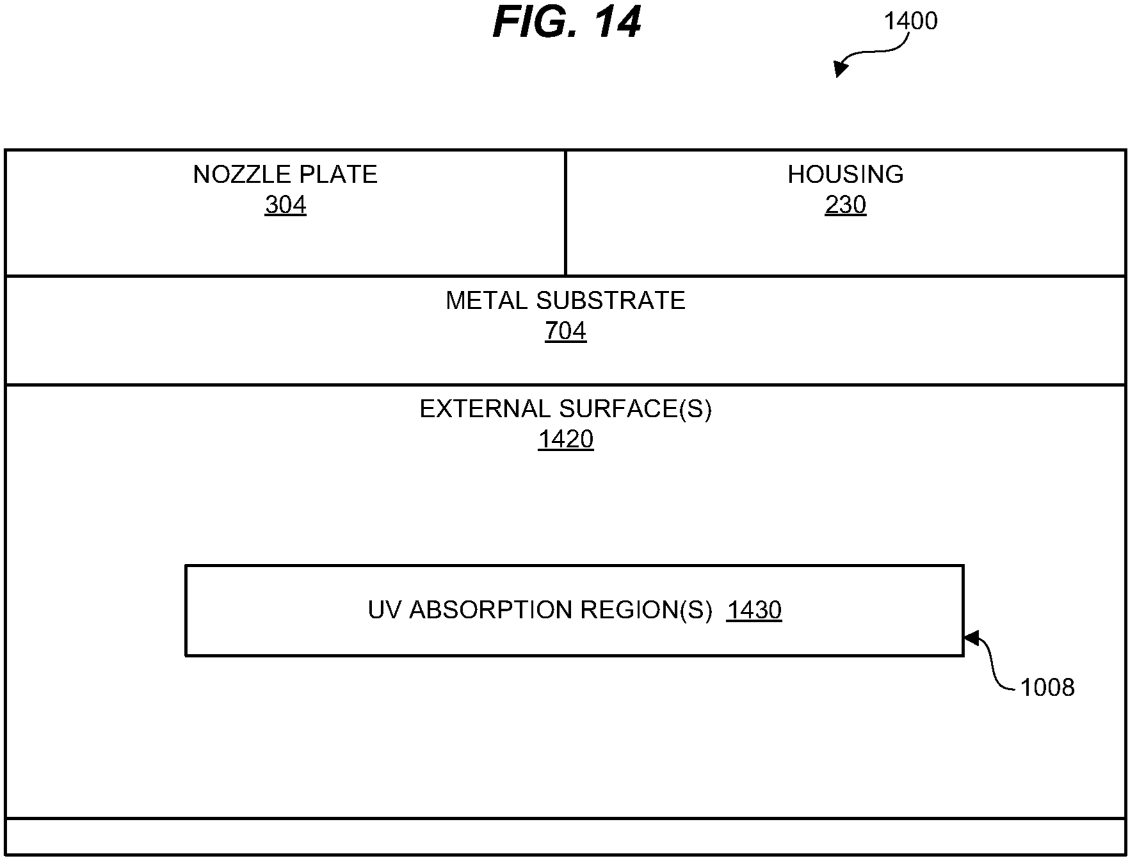
FIG. 14 is a block diagram of a structural element of a printhead in an illustrative embodiment.

In further examples, laser treatment 1000 may be applied to additional external surfaces of a printhead 104 to selectively change the surface properties. FIG. 14 is a block diagram of a structural element 1400 of a printhead 104 in an illustrative embodiment. Structural element 1400 may comprise a nozzle plate 304 of printhead 104, a housing 230 of printhead 104, etc. In an embodiment, one or more laser-altered surface textures 1008 may be formed directly on one or more external surfaces 1420 of the structural element 1400 via a laser treatment 1000. For example, one or more laser-altered surface textures 1008 may be formed directly on the metal substrate 704 of nozzle plate 304 (i.e., on discharge surface 220) or directly on the metal substrate 704 of the housing 230 to define one or more UV absorption regions 1430 on the external surface 1420. A UV absorption region 1430 comprises an area or areas on a surface configured to absorb UV light. A printhead as described herein may be used to jet UV-curable inks, which are inks that are dried onto a medium with UV light. A UV lamp or other light source may be disposed downstream of a printhead, disposed on a carriage assembly with a printhead, etc., to emit UV light to dry a UV-curable ink printed on a medium. One technical benefit of forming a UV absorption region(s) 1430 on an external surface 1420 of printhead 104 is the UV absorption region(s) 1430 absorb stray UV light, and reduce drying of the UV-curable ink on the discharge surface 220. The 2D layout 1200 of a UV absorption region(s) 1430 may vary as desired. For example, a UV absorption region(s) 1430 may be disposed over a surface area (e.g., a total surface area) of an external surface 1420, over a portion of an external surface 1420 (e.g., proximate to edges), etc.

Figure 15A:
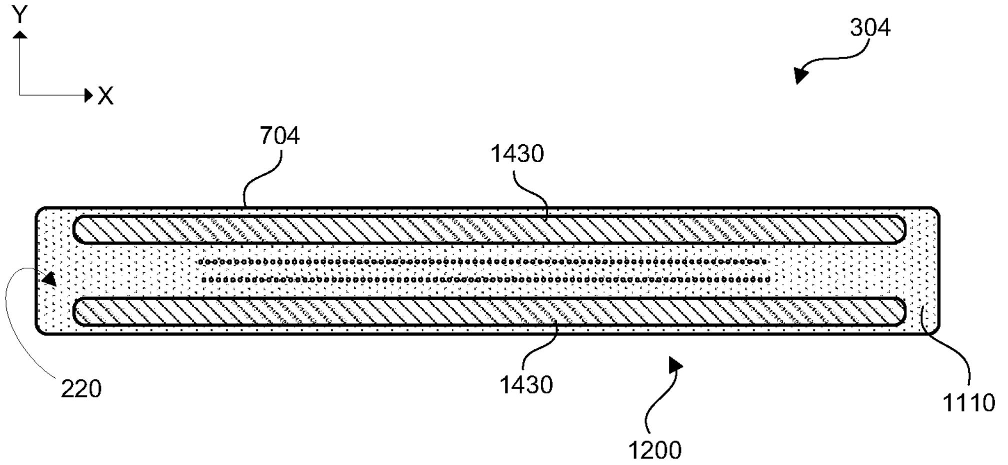
FIG. 15A shows a 2D layout of a UV absorption region(s) on a nozzle plate in an illustrative embodiment.

FIG. 15A shows a 2D layout 1200 of a UV absorption region(s) 1430 on a nozzle plate 304 in an illustrative embodiment. FIG. 15A is a plan view of a nozzle plate 304 showing the discharge surface 220, and FIG. 15A is not drawn to scale. A laser-altered surface texture 1008 defines one or more UV absorption regions 1430 on the discharge surface 220. In an embodiment, the pattern (or set of patterns) for a laser-altered surface texture 1008 used to form a UV absorption region 1430 may be different than a pattern used to form a non-wetting region 1110 and/or a wetting region 1120 on discharge surface 220. In another embodiment, a pattern for a laser-altered surface texture 1008 may form both a UV absorption region 1430 and a non-wetting region 1110, or a UV absorption region 1430 and a wetting region 1120.

Figure 15B:
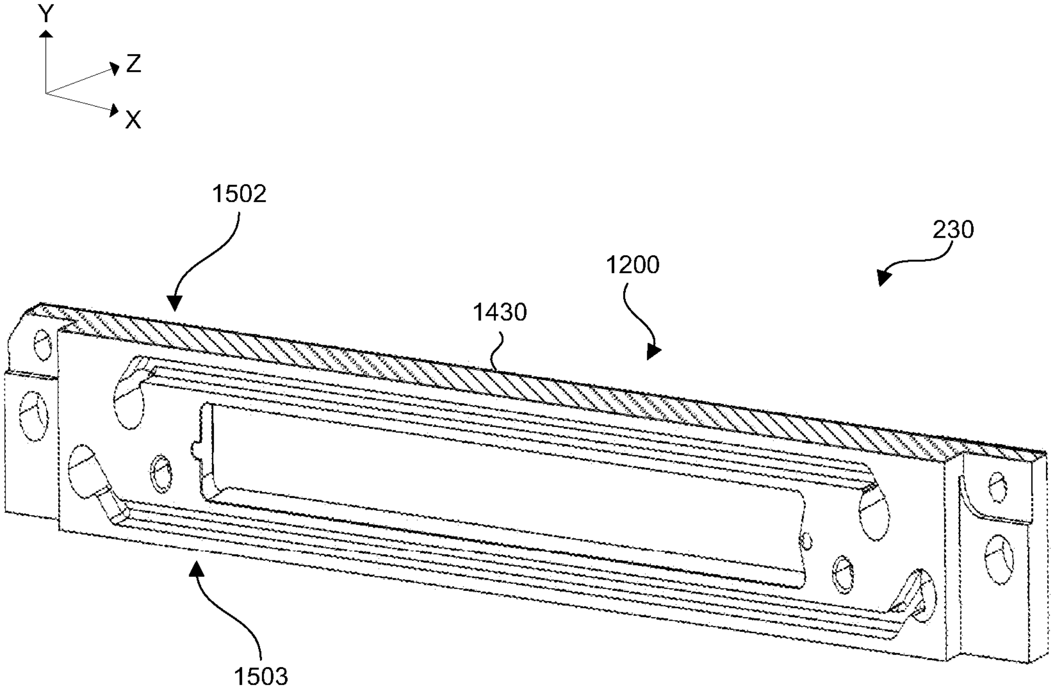
FIG. 15B shows a 2D layout of a UV absorption region on a housing in an illustrative embodiment.

FIG. 15B shows a 2D layout 1200 of a UV absorption region 1430 on a housing 230 in an illustrative embodiment. FIG. 15B is a perspective view of the housing 230, and FIG. 15B is not drawn to scale. Housing 230 comprises opposing sides 1502-1503, which comprise external surfaces 1420 of printhead 104. A laser-altered surface texture 1008 defines a UV absorption region 1430 on the side 1502 of the housing 230. The opposing side 1503 (not visible in FIG. 15B) may also include a UV absorption region 1430. The UV absorption region 1430 may be disposed over a surface area (e.g., a total surface area) of the sides 1502-1503, or a portion of the sides 1502-1503.

Figure 16:
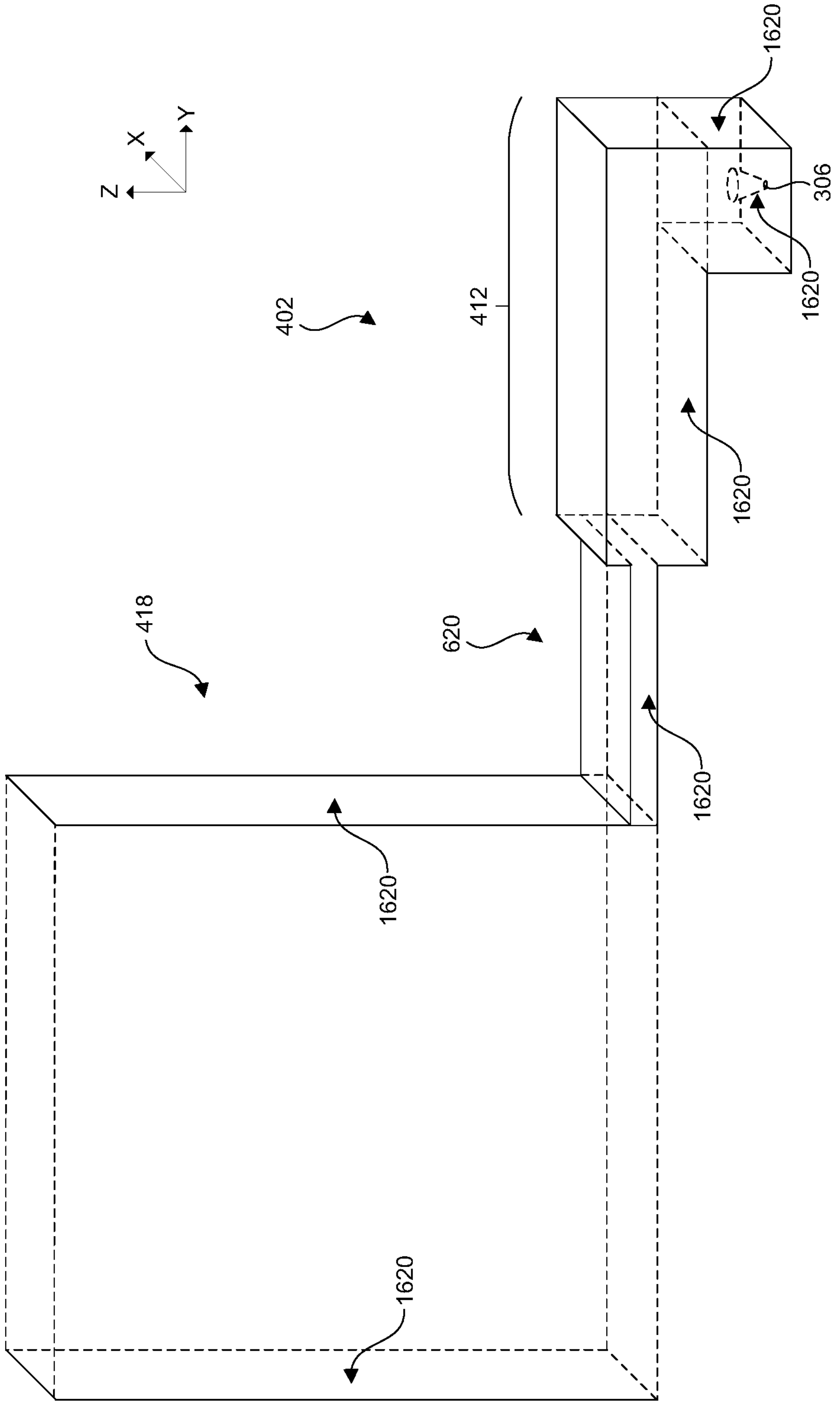
FIG. 16 is a perspective view of internal surfaces of a printhead in an illustrative embodiment.

In an embodiment, laser treatment 1000 may be applied to one or more internal or interior surfaces of a printhead. For example, laser treatment 1000 may be applied to internal surfaces of a manifold 418, jetting channels 402, channel fluid passages 620 (e.g., restrictors), etc., to selectively change the hydrophilic properties and/or other properties of the internal surfaces. FIG. 16 is a perspective view of internal surfaces 1620 of a printhead 104 in an illustrative embodiment. This view shows various internal surfaces 1620 of a manifold 418, a channel fluid passage 620, and a jetting channel 402 (not all surfaces are labelled for the sake of brevity). Laser treatment 1000 may be applied to one or more of the internal surfaces 1620 to define one or more wetting regions 1120 on the internal surfaces 1620.

Figure 17:
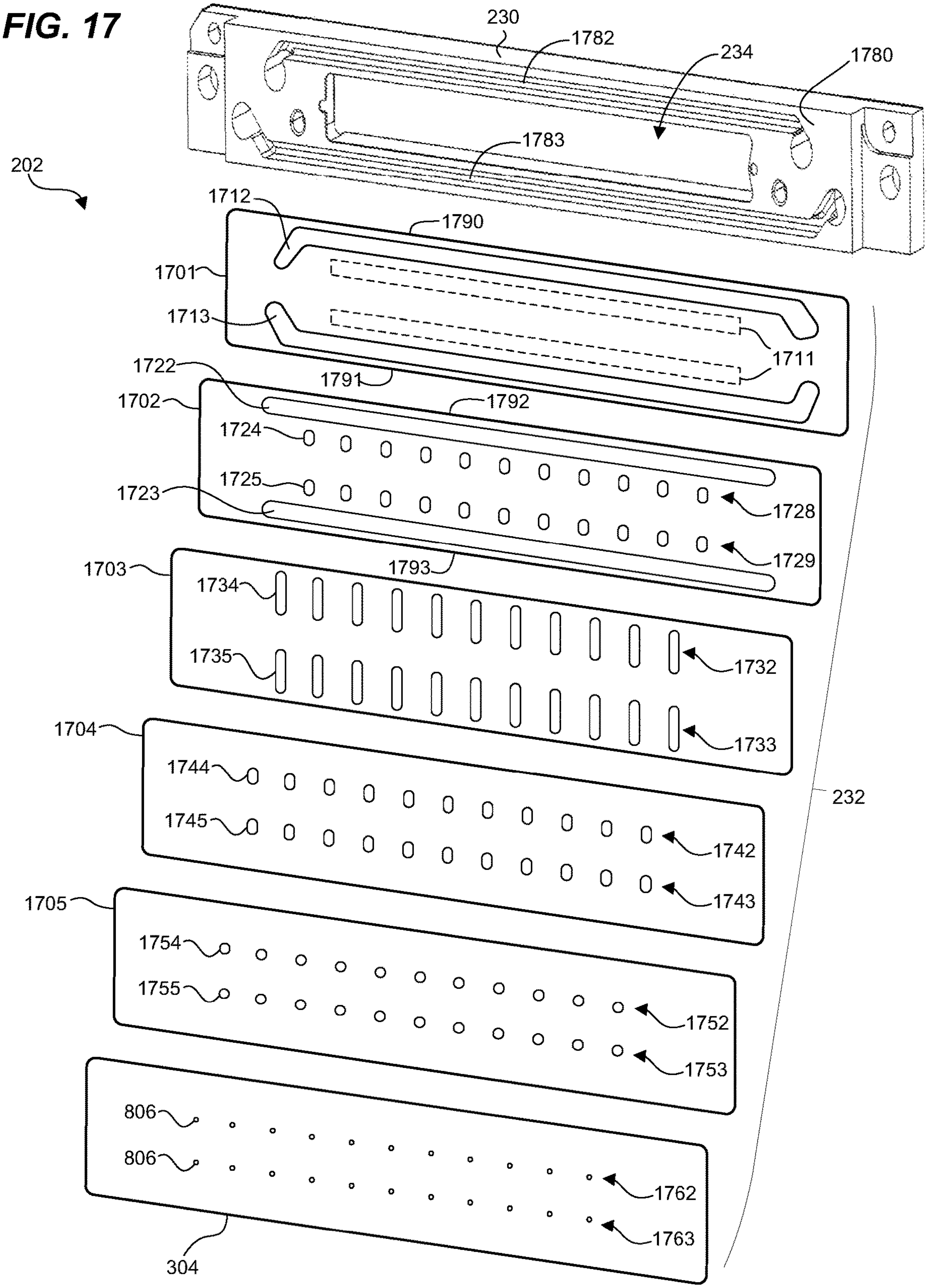
FIG. 17 illustrates an exploded, perspective view of a head member of a printhead in an illustrative embodiment.
Figure 18:
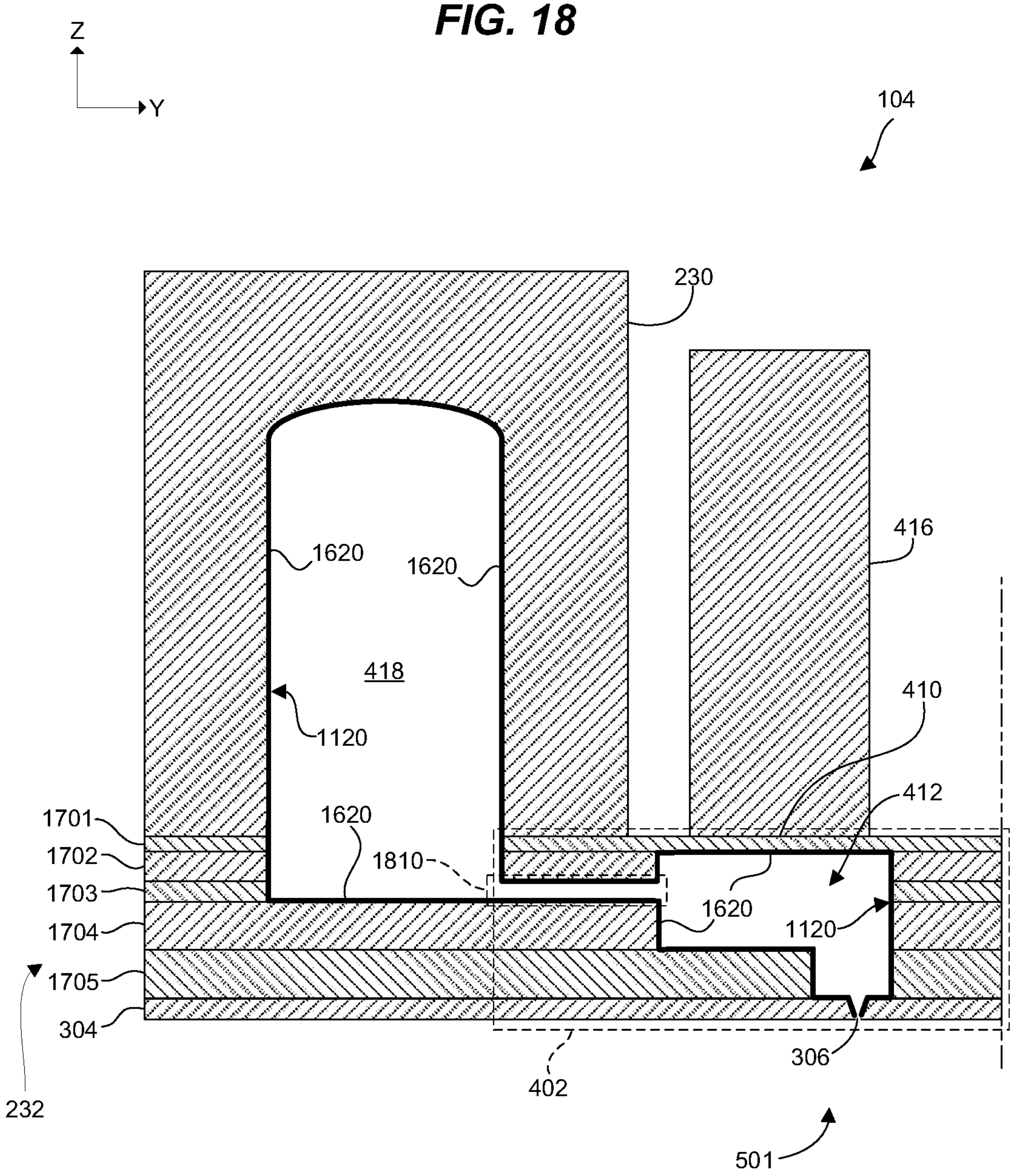
FIG. 18 is a cross-sectional view of a portion of a printhead in an illustrative embodiment.

To apply laser treatment 1000 to the internal surfaces 1620, individual structural elements of a printhead 104 may be processed before assembly of the printhead 104. FIGS. 17-18 provide an example of structural elements of a printhead 104.

FIG. 17 illustrates an exploded, perspective view of a head member 202 of a printhead 104 in an illustrative embodiment. In this embodiment, head member 202 is an assembly that includes housing 230 and plate stack 232. Plate stack 232 is affixed or bonded to an interface surface 1780 of housing 230, and forms rows of jetting channels 402. Housing 230 is an elongated member made from a rigid material, such as stainless steel or another metal substrate 704. Housing 230 has a length, a width, and a height, and the dimensions of housing 230 are such that the length is greater than the width. The direction of a row of jetting channels 402 corresponds with the length of housing 230. Housing 230 includes access hole 234 at or near its center that extends from I/O surface (not visible) through to an opposing interface surface 1780. Access hole 234 provides passage way for an actuator assembly (not shown), such as a plurality of piezoelectric actuators, to pass through and contact diaphragms 410 of the jetting channels 402. Interface surface 1780 is the surface of housing 230 that faces plate stack 232, and interfaces with a plate of plate stack 232. Housing 230 also includes manifold ducts 1782-1783 that extend longitudinally along a length of interface surface 1780. A manifold duct 1782-1783 comprises an elongated cut or groove along interface surface 1780 that is configured to convey a print fluid, and forms at least a portion of a manifold for printhead 104.

Plate stack 232 includes a series of plates 1701-1705 and 304 that are fixed or bonded to one another to form a laminated plate structure. Plate stack 232 illustrated in FIG. 17 is intended to be an example of a basic structure of a printhead. There may be additional plates of plate stack 232 that are not shown in FIG. 17, and the configuration of the various plates may vary as desired. Also, FIG. 17 is not drawn to scale.

In an embodiment, plate stack 232 includes the following plates: a diaphragm plate 1701, a support plate 1702, a restrictor plate 1703, chamber plates 1704-1705, and a nozzle plate 304. Diaphragm plate 1701 is a thin layer or sheet of metal material (i.e., a metal substrate 704) that is generally rectangular in shape and is substantially flat or planar. Diaphragm plate 1701 includes diaphragms 1711 comprising a sheet of a semi-flexible material that forms the diaphragms 410 of the jetting channels 402. Diaphragm plate 1701 further includes manifold openings 1712-1713. A manifold opening is an aperture or hole though a plate that forms at least part of a manifold for jetting channels 402. Manifold opening 1712 extends longitudinally along diaphragm plate 1701 between a longitudinal side 1790 of diaphragm plate 1701 and diaphragms 1711 for a row of jetting channels 402, and is fluidly coupled with a manifold duct 1782 of housing 230. Manifold opening 1713 extends longitudinally along diaphragm plate 1701 between the other longitudinal side 1791 of diaphragm plate 1701 and diaphragms 1711 for another row of jetting channels 402, and is fluidly coupled with a manifold duct 1783 of housing 230.

Support plate 1702 (also referred to as a spacer plate) is a thin layer or sheet of metal material (i.e., a metal substrate 704) that is generally rectangular in shape and is substantially flat or planar. Support plate 1702 includes manifold openings 1722-1723 and chamber openings 1724-1725. In general, a chamber opening is an aperture or hole though a plate that forms at least part of a pressure chamber 412 for a jetting channel 402. Thus, chamber openings 1724 comprise apertures or holes through support plate 1702 generally aligned longitudinally in a linear row 1728, and configured to form at least part of the pressure chambers 412 in a first row 501 of jetting channels 402. Manifold opening 1722 is an elongated opening that extends longitudinally along support plate 1702 between a longitudinal side 1792 of support plate 1702 and chamber openings 1724 in linear row 1728, and generally in parallel with the linear row 1728 of chamber openings 1724. Chamber openings 1725 comprise apertures or holes through support plate 1702 generally aligned longitudinally in a linear row 1729, and configured to form at least part of the pressure chambers 412 for a second (adjacent) row 502 of jetting channels 402. Manifold opening 1723 is an elongated opening that extends longitudinally along support plate 1702 between the other longitudinal side 1793 of support plate 1702 and chamber openings 1725 in linear row 1729, and generally in parallel with the linear row 1729 of chamber openings 1725.

Restrictor plate 1703 is a thin layer or sheet of metal material (i.e., a metal substrate 704) that is generally rectangular in shape and is substantially flat or planar. Restrictor plate 1703 includes restrictor openings 1734-1735. In general, a restrictor opening is an elongated aperture or hole through a plate that defines a channel fluid passage 620 between a manifold and an individual jetting channel 402. Restrictor openings 1734 are elongated apertures or holes through restrictor plate 1703 each oriented transversely, and generally aligned longitudinally in a linear row 1732. Restrictor openings 1734 are configured to fluidly couple pressure chambers 412 of a first row 501 of jetting channels 402 with a manifold (i.e., formed by manifold duct 1782, manifold opening 1722, manifold opening 1712, etc.). Restrictor openings 1734 at least in part define restrictors (or a channel fluid passage 620) for individual jetting channels 402 in the first row 501. Thus, restrictor openings 1734 are each configured to fluidly couple an individual one of the pressure chambers 412 of the jetting channels 402 in the first row 501 with a manifold (e.g., manifold 418). Restrictor openings 1735 are elongated apertures or holes through restrictor plate 1703 each oriented transversely, and generally aligned longitudinally in a linear row 1733. Restrictor openings 1735 are configured to fluidly couple pressure chambers 412 of jetting channels 402 in a second row 502 with a manifold (i.e., formed by manifold duct 1783, manifold opening 1723, manifold opening 1713, etc.). Restrictor openings 1735 at least in part define restrictors for individual jetting channels 402 in the second row 502. Thus, restrictor openings 1735 are each configured to fluidly couple an individual one of the pressure chambers 412 of the jetting channels 402 in the second row 502 with a manifold (e.g., manifold 418).

Chamber plate 1704 is a thin layer or sheet of metal material (i.e., a metal substrate 704) that is generally rectangular in shape and substantially flat or planar. Chamber plate 1704 includes chamber openings 1744-1745. Chamber openings 1744 are apertures or holes through chamber plate 1704 generally aligned longitudinally in a linear row 1742, and form at least part of the pressure chambers 412 of jetting channels 402 in a first row 501. Chamber openings 1745 are apertures or holes through chamber plate 1704 generally aligned longitudinally in a linear row 1743, and form at least part of the pressure chambers 412 of jetting channels 402 in a second row 502.

Chamber plate 1705 is a thin layer or sheet of metal material (i.e., a metal substrate 704) that is generally rectangular in shape and substantially flat or planar. Chamber plate 1705 includes chamber openings 1754-1755. Chamber openings 1754 are apertures or holes through chamber plate 1705 generally aligned longitudinally in a linear row 1752, and form at least part of the pressure chambers 412 of jetting channels 402 in a first row 501. Chamber openings 1755 are apertures or holes through chamber plate 1705 generally aligned longitudinally in a linear row 1753, and form at least part of the pressure chambers 412 of jetting channels 402 in a second row 502.

Nozzle plate 304 (as described above) is a thin layer or sheet of metal material (i.e., a metal substrate 704) that is generally rectangular in shape and substantially flat or planar. Nozzle plate 304 includes nozzle holes 806 that form nozzles 306 of the jetting channels 402. For example, nozzle holes 806 may be generally aligned longitudinally in a linear row 1762 to form the nozzles 306 of jetting channels 402 in a first row 501, and may be generally aligned longitudinally in a linear row 1763 to form the nozzles 306 of jetting channels 402 in a second row 502.

FIG. 18 is a cross-sectional view of a portion of a printhead 104 in an illustrative embodiment with a plate stack 232 as in FIG. 17. FIG. 18 shows a cross-section of printhead 104 along cut-plane 6-6 in FIG. 3 to show a jetting channel 402 in row 501. Printhead 104 includes housing 230 and plate stack 232 affixed or attached to housing 230 to form jetting channels 402. As above, plate stack 232 includes diaphragm plate 1701, support plate 1702, restrictor plate 1703, chamber plates 1704-1705, and nozzle plate 304. A nozzle hole 806 of nozzle plate 304 defines the nozzle 306 of the jetting channel 402 (see also, FIG. 17). A chamber opening 1754 of chamber plate 1705, a chamber opening 1744 of chamber plate 1704, a restrictor opening 1734 of restrictor plate 1703, and a chamber opening 1724 of support plate 1702 form or define the pressure chamber 412 of the jetting channel 402. The restrictor opening 1734, in conjunction with chamber plate 1704 and support plate 1702, form or define a restrictor 1810 that comprises the channel fluid passage 620 configured to control or regulate a flow of print fluid between manifold 418 and pressure chamber 412. Manifold openings 1712 and 1722 of diaphragm plate 1701 and support plate 1702, in conjunction with manifold duct 1782 of housing 230, form or define manifold 418.

In an embodiment, laser treatment 1000 may be applied to one or more internal surfaces 1620 of the manifold(s) 418, channel fluid passage 620 (e.g., restrictor 1810), and/or jetting channels 402 of a printhead 104 (illustrated as bold lines in FIG. 18) that are in a flow path of print fluid through the printhead 104. As an example, a laser-altered surface texture 1008 may be formed directly on one or more internal surfaces 1620 of a manifold 418 via a laser treatment 1000 to define one or more wetting regions 1120 on the internal surface(s) 1620 of the manifold 418. In another example, a laser-altered surface texture 1008 may be formed directly on one or more internal surfaces 1620 of jetting channels 402 via a laser treatment 1000 to define one or more wetting regions 1120 on the internal surface(s) 1620 of the jetting channels 402. In another example, a laser-altered surface texture 1008 may be formed directly on one or more internal surfaces 1620 of channel fluid passages 620 (e.g., restrictors 1810) via a laser treatment 1000 to define one or more wetting regions 1120 on the internal surface(s) 1620 of the channel fluid passages 620. In an example, a laser-altered surface texture 1008 may be formed directly on a surface of diaphragm 410 to promote coupling (e.g., bonding, stiction, etc.) between actuator 416 and the surface of diaphragm 410 using a coupling media (e.g., silicone).

Figure 19:
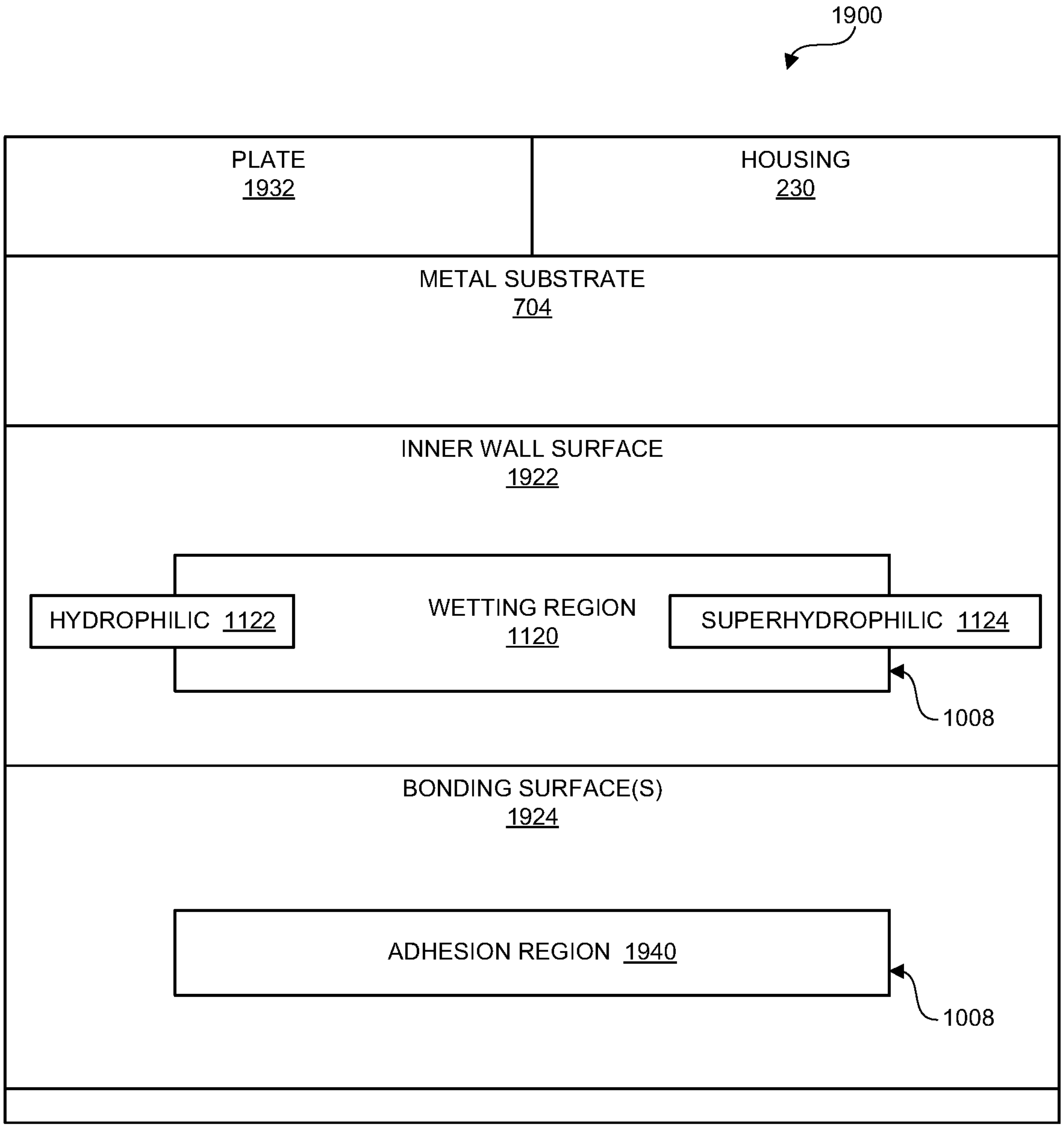
FIG. 19 is a block diagram of a structural element of a printhead in an illustrative embodiment.

FIG. 19 is a block diagram of a structural element 1900 of a printhead 104 in an illustrative embodiment. Structural element 1900 may comprise a plate 1932 of a plate stack 232 of printhead 104, a housing 230 of printhead 104, etc. In an embodiment, one or more laser-altered surface textures 1008 may be formed directly on a metal substrate 704 of a plate 1932 and/or directly on the metal substrate 704 of the housing 230. In an embodiment, a laser-altered surface texture 1008 may define one or more wetting regions 1120 on one or more inner wall surfaces 1922 of the structural element 1900. An inner wall surface 1922 comprises a surface that forms an inner wall of an element within a printhead (e.g., a manifold 418, a jetting channel 402, a channel fluid passage 620, a nozzle plate 304, etc.) that conveys or comes into contact with a print fluid, such as ink. An inner wall surface 1922 of a structural element 1900 corresponds with or forms an internal surface 1620 of printhead 104 when assembled. The 2D layouts 1200 of the wetting region(s) 1120 may vary as desired.

In another embodiment, a laser-altered surface texture 1008 may define one or more adhesion regions 1940 on one or more bonding surfaces 1924 of the structural element 1900. A bonding surface 1924 comprises a surface that is bonded or will be bonded to another structural element 1900 during assembly. An adhesion region 1940 comprises an area or areas on a surface configured to improve a bond strength when an adhesive or bonding agent is used. For example, plate stack 232 of printhead 104 is a series of plates 1932 that are fixed or bonded to one another to form a laminated stack. An adhesion region 1940 may be strategically placed on a bonding surface 1924 of a plate 1932, and the laser-altered surface texture 1008 or roughness of the adhesion region 1940 promotes bonding between a metal substrate 704 and a bonding agent. One technical benefit is the bond strength may be improved.

Laser treatment 1000 may be applied to unassembled structural elements 1900 of printhead 104. FIGS. 20-26 illustrate various structural elements 1900 of printhead 104, and FIGS. 27-33B illustrate cross-sections of the structural elements 1900 showing the wetting regions 1120 formed on the inner wall surfaces 1922. FIGS. 20-33B are provided as an example, and are not drawn to scale.

Figure 20:
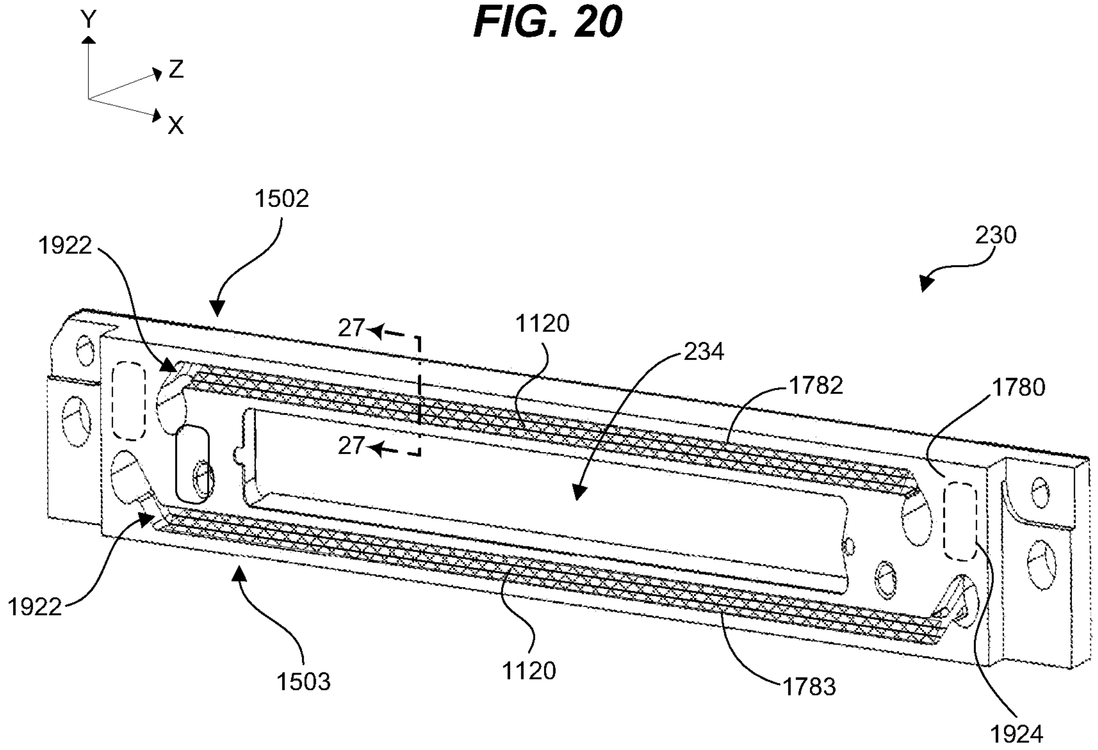
FIG. 20 is a perspective view of a housing in an illustrative embodiment.

FIG. 20 is a perspective view of a housing 230 in an illustrative embodiment. As described above, housing 230 includes an interface surface 1780 that faces plate stack 232, and interfaces with a plate of plate stack 232. Housing 230 includes manifold ducts 1782-1783 that extend longitudinally along a length of interface surface 1780, and are each configured to form at least a portion of a manifold for printhead 104. Surfaces of manifold ducts 1782-1783 represent internal surfaces 1620 of an assembled printhead 104 configured to contact or interact with a print fluid (e.g., ink). Thus, these internal surfaces 1620 are referred to as inner wall surfaces 1922, but may also be referred to as liquid contact surfaces, ink contact surfaces, etc., for an unassembled printhead 104. A laser treatment 1000 may be applied to inner wall surfaces 1922 of manifold ducts 1782-1783 to define one or more wetting regions 1120 on the inner wall surfaces 1922. FIG. 20 further illustrates one or more bonding surfaces 1924 on interface surface 1780 of housing 230. A laser treatment 1000 may be applied to the bonding surfaces 1924 of housing 230 to define one or more adhesion regions 1940 on the bonding surfaces 1924.

Figure 27:
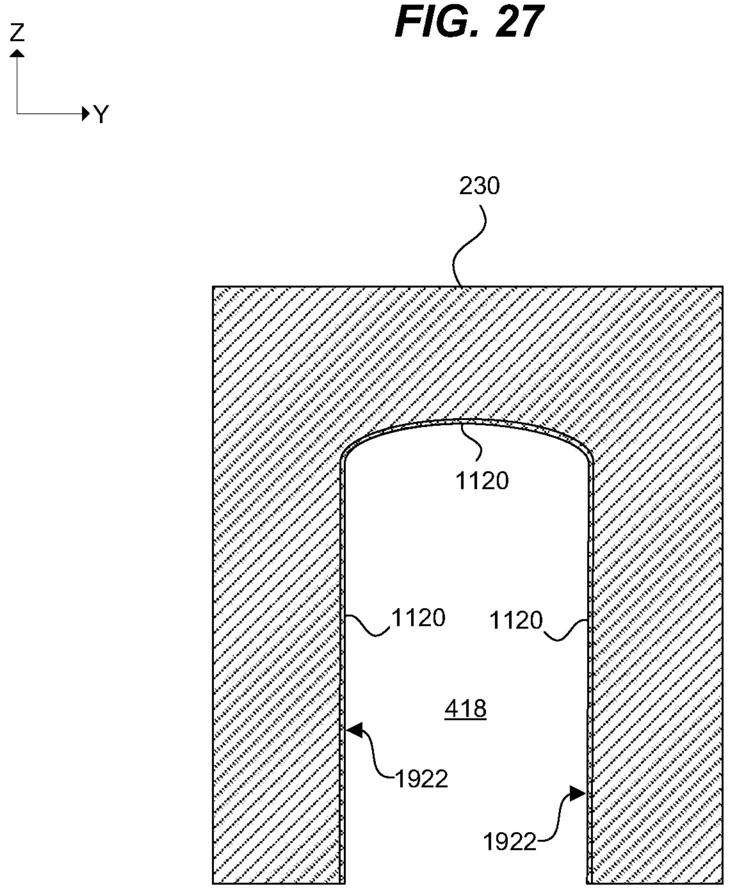
FIG. 27 is a cross-sectional view of a housing in an illustrative embodiment.

FIG. 27 is a cross-sectional view of housing 230 in an illustrative embodiment. FIG. 27 shows a cross-section along cut-plane 27-27 in FIG. 20. A laser-altered surface texture 1008 may be formed directly on one or more of the inner wall surfaces 1922 of the housing 230 via a laser treatment 1000 to define one or more wetting regions 1120.

Figure 21:
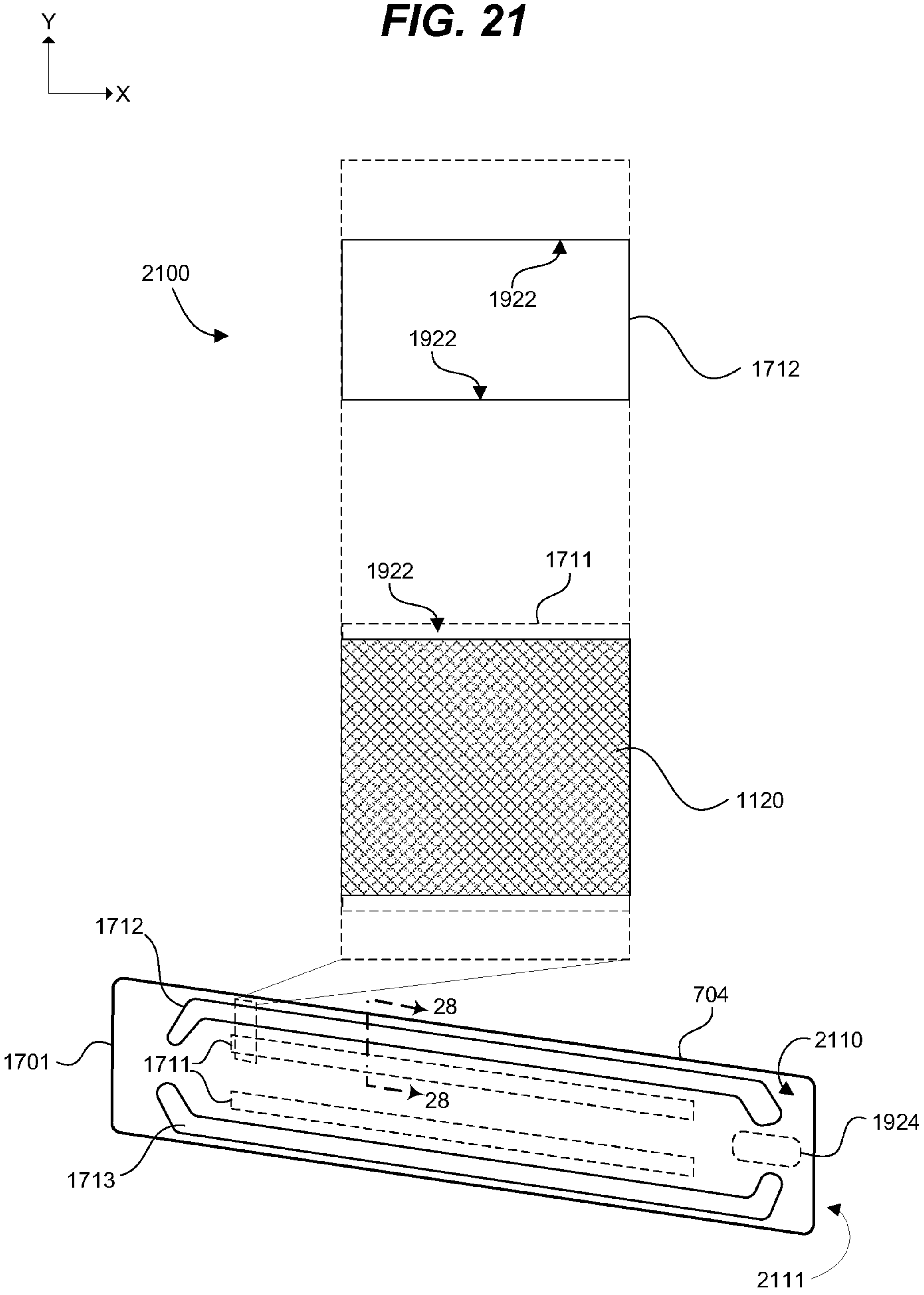
FIG. 21 is a perspective view of a diaphragm plate in an illustrative embodiment.

FIG. 21 is a perspective view of a diaphragm plate 1701 in an illustrative embodiment. As described above, diaphragm plate 1701 is a substantially flat metal substrate 704, and thus has opposing surfaces 2110-2111. Surface 2110 faces toward the discharge surface 220 of the printhead 104, while surface 2111 faces toward housing 230. Magnification window 2100 illustrates a magnified view of diaphragm plate 1701. A portion of surface 2110 at a diaphragm 1711 forms a wall of a pressure chamber 412 of a jetting channel 402, and represents an inner wall surface 1922. Also, manifold opening 1712, which forms at least part of a manifold, includes a hole surface that represents an inner wall surface 1922. A laser treatment 1000 may be applied to the inner wall surfaces 1922 of diaphragm plate 1701 to define one or more wetting regions 1120 on the inner wall surfaces 1922. FIG. 21 further illustrates one or more bonding surfaces 1924 on diaphragm plate 1701. A laser treatment 1000 may be applied to the bonding surfaces 1924 (on one or both of surfaces 2110-2111) of diaphragm plate 1701 to define one or more adhesion regions 1940 on the bonding surfaces 1924.

Figure 28:
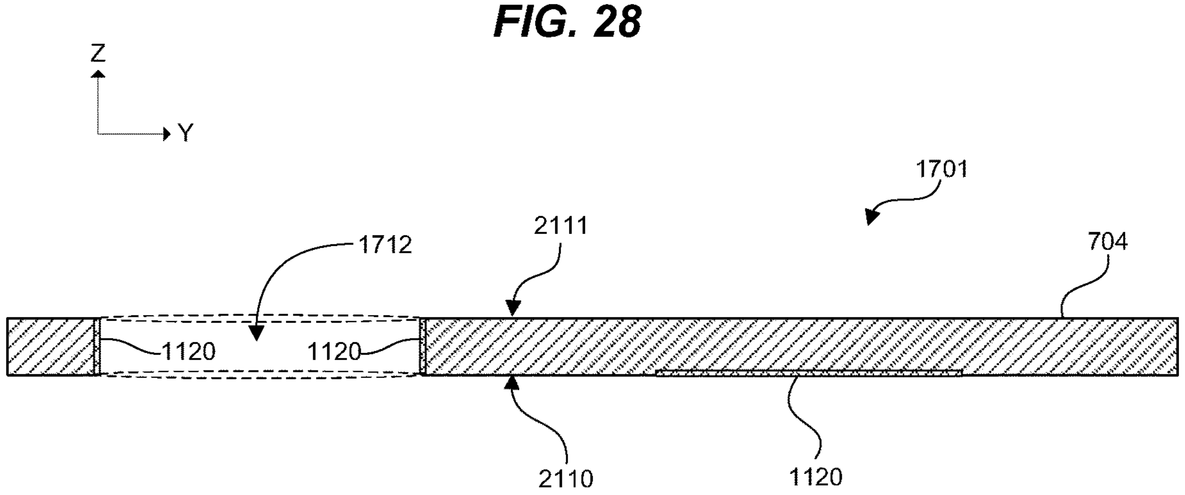
FIG. 28 is a cross-sectional view of a diaphragm plate in an illustrative embodiment.

FIG. 28 is a cross-sectional view of diaphragm plate 1701 in an illustrative embodiment. FIG. 28 shows a cross-section along cut-plane 28-28 in FIG. 21. A laser-altered surface texture 1008 may be formed directly on one or more of the inner wall surfaces 1922 of the diaphragm plate 1701 via a laser treatment 1000 to define one or more wetting regions 1120.

Figure 22:
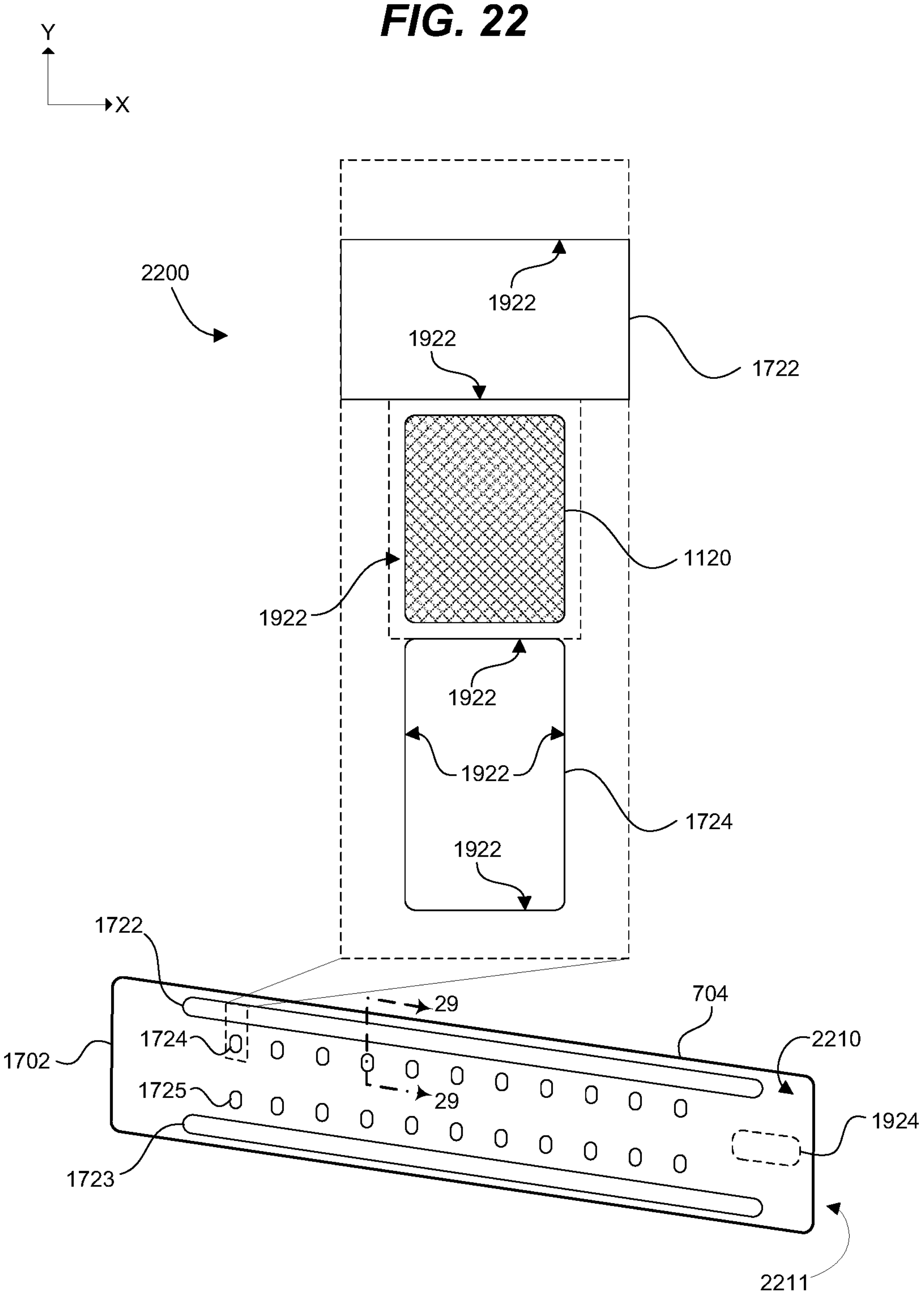
FIG. 22 is a perspective view of a support plate in an illustrative embodiment.

FIG. 22 is a perspective view of a support plate 1702 in an illustrative embodiment. As described above, support plate 1702 is a substantially flat metal substrate 704, and thus has opposing surfaces 2210-2211. Surface 2210 faces toward the discharge surface 220 of the printhead 104, while surface 2211 faces toward housing 230. Magnification window 2200 illustrates a magnified view of support plate 1702. Support plate 1702 includes a manifold opening 1722 and a chamber opening 1724. Manifold opening 1722 forms at least part of a manifold, and includes a hole surface that represents an inner wall surface 1922. Chamber opening 1724 forms at least part of a pressure chamber 412, and includes a hole surface that represents an inner wall surface 1922. A portion of surface 2210 (between chamber opening 1724 and manifold opening 1722) forms a wall of a restrictor for a jetting channel 402, and also represents an inner wall surface 1922. A laser treatment 1000 may be applied to the inner wall surfaces 1922 of support plate 1702 to define one or more wetting regions 1120 on the inner wall surfaces 1922. FIG. 22 further illustrates one or more bonding surfaces 1924 on support plate 1702. A laser treatment 1000 may be applied to the bonding surfaces 1924 (on one or both of surfaces 2210-2211) of support plate 1702 to define one or more adhesion regions 1940 on the bonding surfaces 1924.

Figure 29:
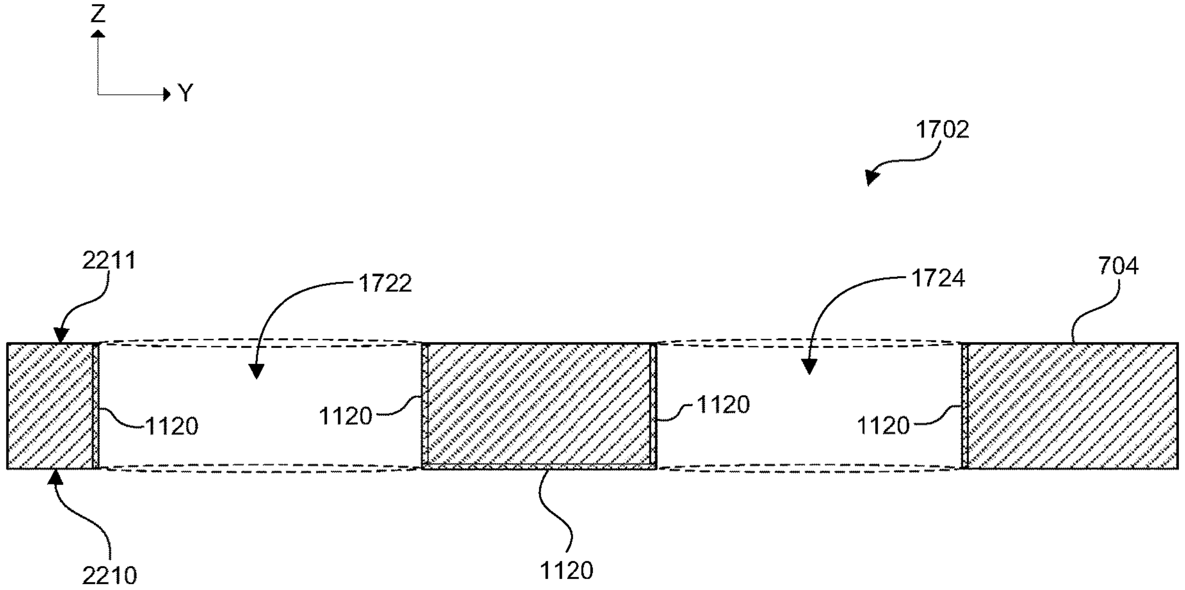
FIG. 29 is a cross-sectional view of a support plate in an illustrative embodiment.

FIG. 29 is a cross-sectional view of support plate 1702 in an illustrative embodiment. FIG. 29 shows a cross-section along cut-plane 29-29 in FIG. 22. A laser-altered surface texture 1008 may be formed directly on one or more of the inner wall surfaces 1922 of the support plate 1702 via a laser treatment 1000 to define one or more wetting regions 1120.

Figure 23:
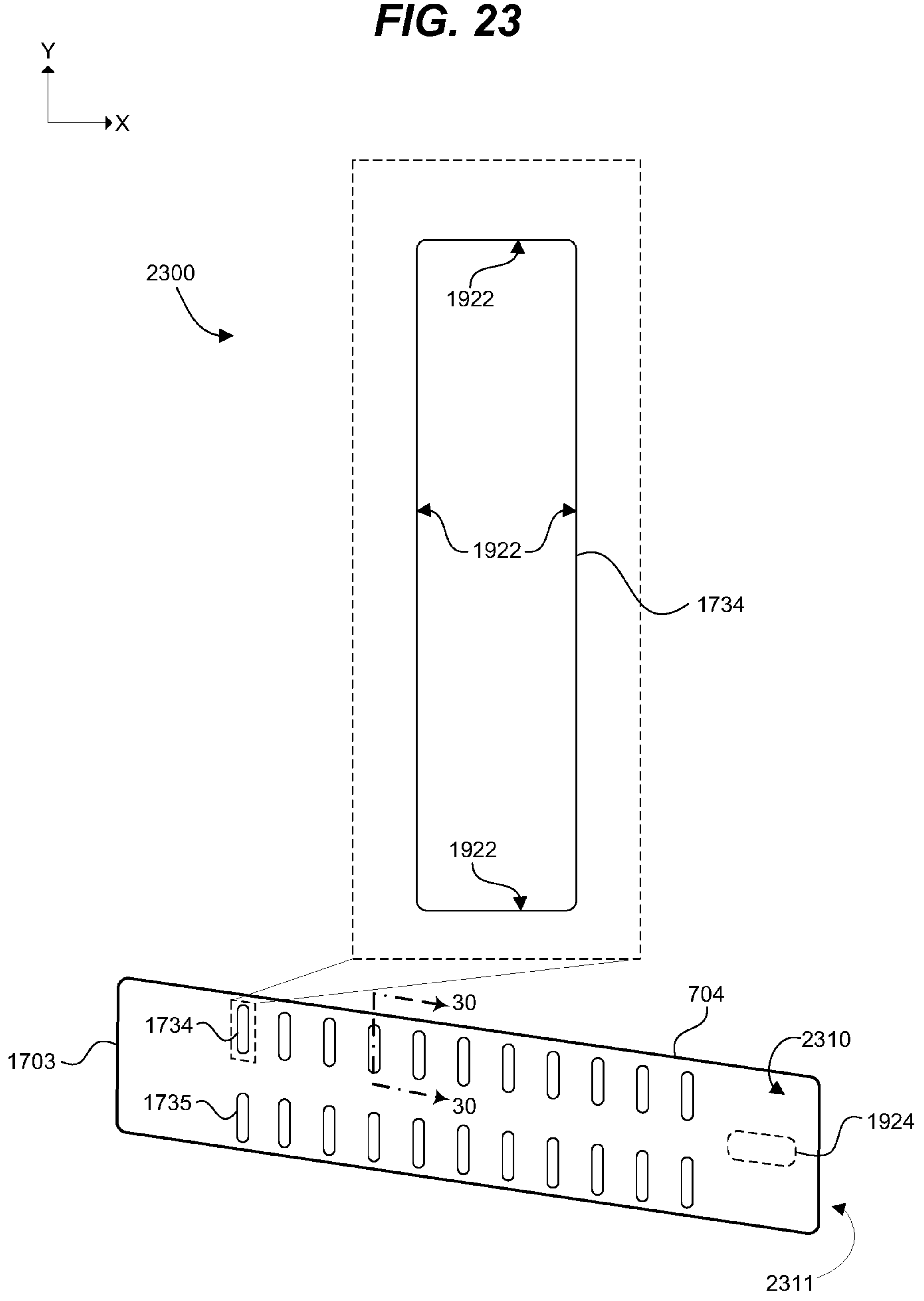
FIG. 23 is a perspective view of a restrictor plate in an illustrative embodiment.

FIG. 23 is a perspective view of a restrictor plate 1703 in an illustrative embodiment. As described above, restrictor plate 1703 is a substantially flat metal substrate 704, and thus has opposing surfaces 2310-2311. Surface 2310 faces toward the discharge surface 220 of the printhead 104, while surface 2311 faces toward housing 230. Magnification window 2300 illustrates a magnified view of restrictor plate 1703. Restrictor plate 1703 includes a restrictor opening 1734 that at least in part defines a restrictor (or a channel fluid passage 620) for a jetting channel 402. Restrictor openings 1734 includes a hole surface that represents an inner wall surface 1922. A laser treatment 1000 may be applied to the inner wall surfaces 1922 of restrictor plate 1703 to define one or more wetting regions 1120 on the inner wall surfaces 1922. FIG. 23 further illustrates one or more bonding surfaces 1924 on restrictor plate 1703. A laser treatment 1000 may be applied to the bonding surfaces 1924 (on one or both of surfaces 2310-2311) of restrictor plate 1703 to define one or more adhesion regions 1940 on the bonding surfaces 1924.

Figure 30:
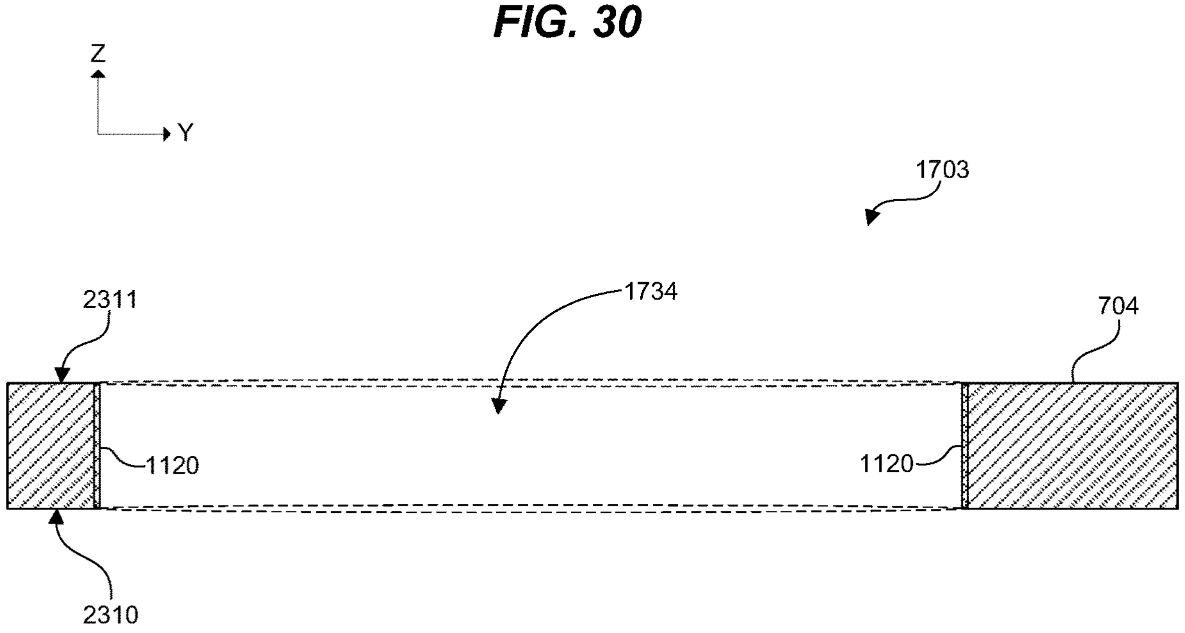
FIG. 30 is a cross-sectional view of a restrictor plate in an illustrative embodiment.

FIG. 30 is a cross-sectional view of restrictor plate 1703 in an illustrative embodiment. FIG. 30 shows a cross-section along cut-plane 30-30 in FIG. 23. A laser-altered surface texture 1008 may be formed directly on one or more of the inner wall surfaces 1922 of the restrictor plate 1703 via a laser treatment 1000 to define one or more wetting regions 1120.

Figure 24:
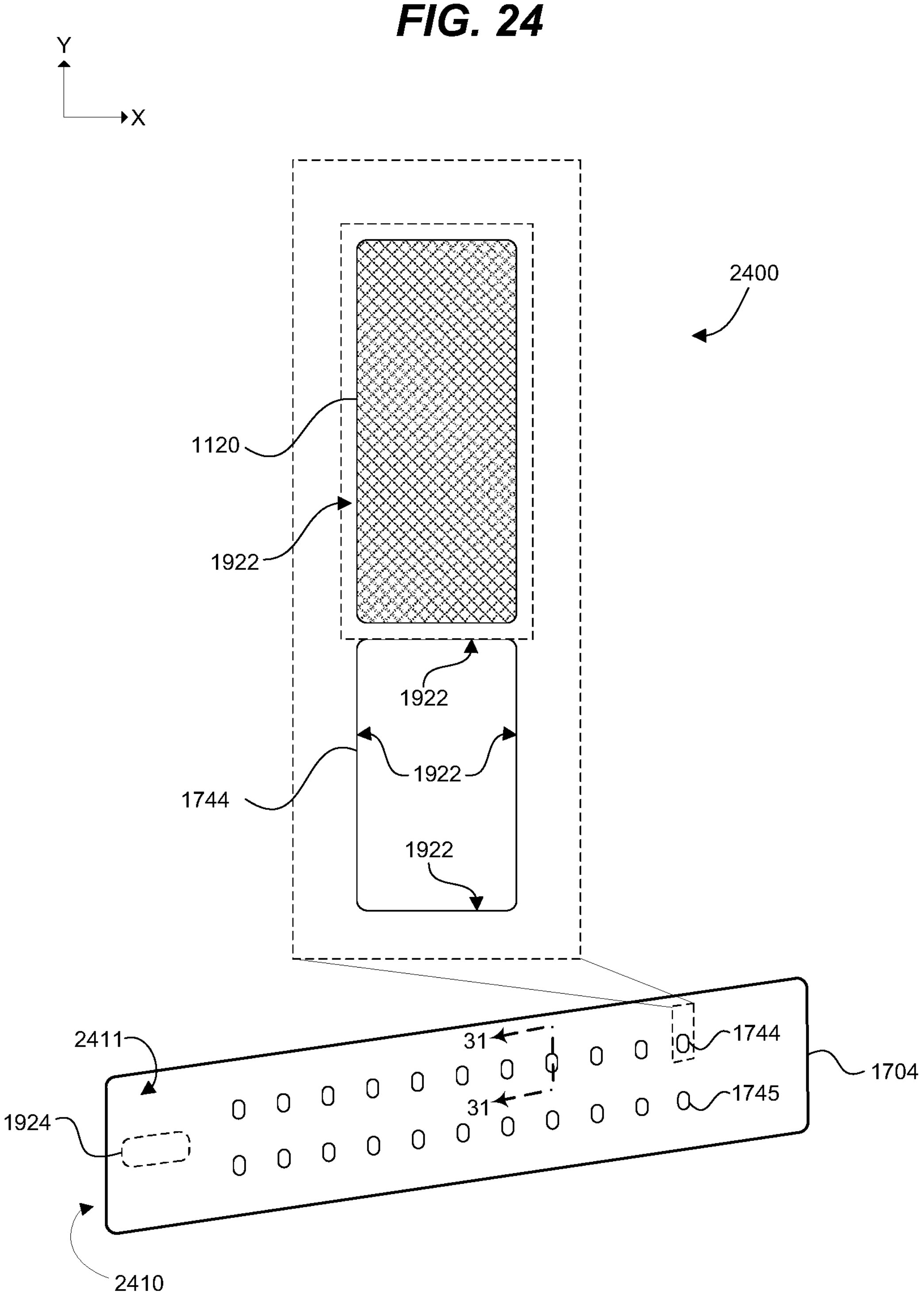
FIG. 24 is a perspective view of a chamber plate in an illustrative embodiment.

FIG. 24 is a perspective view of a chamber plate 1704 in an illustrative embodiment. As described above, chamber plate 1704 is a substantially flat metal substrate 704, and thus has opposing surfaces 2410-2411. Surface 2410 faces toward the discharge surface 220 of the printhead 104, while surface 2411 faces toward housing 230. Magnification window 2400 illustrates a magnified view of chamber plate 1704. Chamber plate 1704 includes a chamber opening 1744 that forms at least part of a pressure chamber 412, and includes a hole surface that represents an inner wall surface 1922. A portion of surface 2411 (between chamber opening 1744 and a longitudinal side of chamber plate 1704) forms a wall of a manifold and a wall of a restrictor for a jetting channel 402, and also represents an inner wall surface 1922. A laser treatment 1000 may be applied to the inner wall surfaces 1922 of chamber plate 1704 to define one or more wetting regions 1120 on the inner wall surfaces 1922. FIG. 24 further illustrates one or more bonding surfaces 1924 on chamber plate 1704. A laser treatment 1000 may be applied to the bonding surfaces 1924 (on one or both of surfaces 2410-2411) of chamber plate 1704 to define one or more adhesion regions 1940 on the bonding surfaces 1924.

Figure 31:
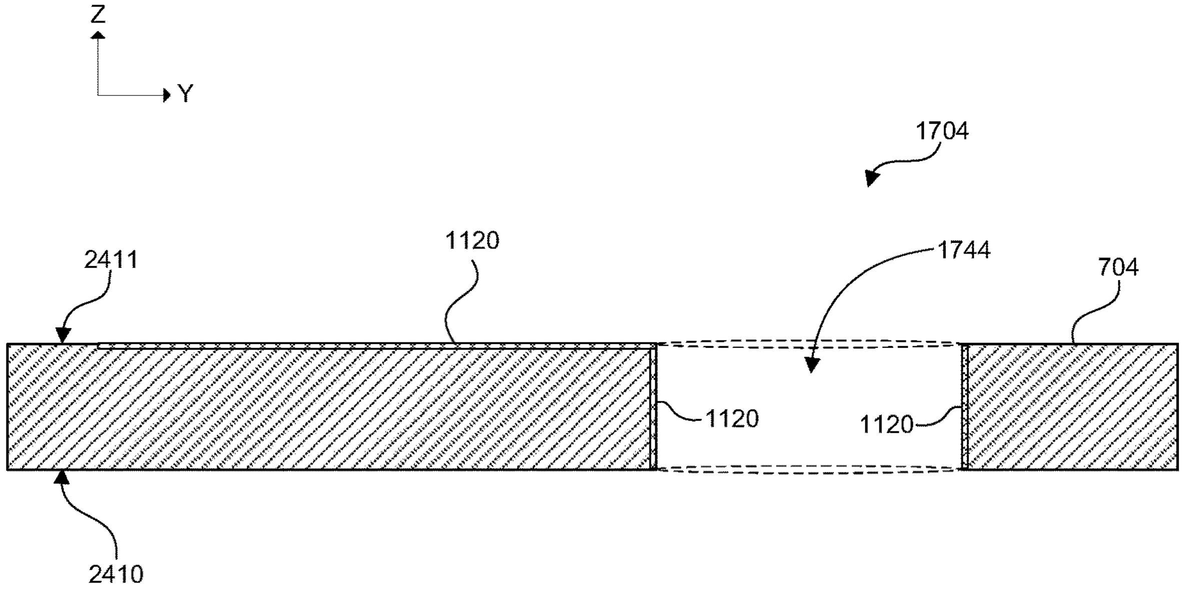
FIG. 31 is a cross-sectional view of a chamber plate in an illustrative embodiment.

FIG. 31 is a cross-sectional view of chamber plate 1704 in an illustrative embodiment. FIG. 31 shows a cross-section along cut-plane 31-31 in FIG. 24. A laser-altered surface texture 1008 may be formed directly on one or more of the inner wall surfaces 1922 of the chamber plate 1704 via a laser treatment 1000 to define one or more wetting regions 1120.

Figure 25:
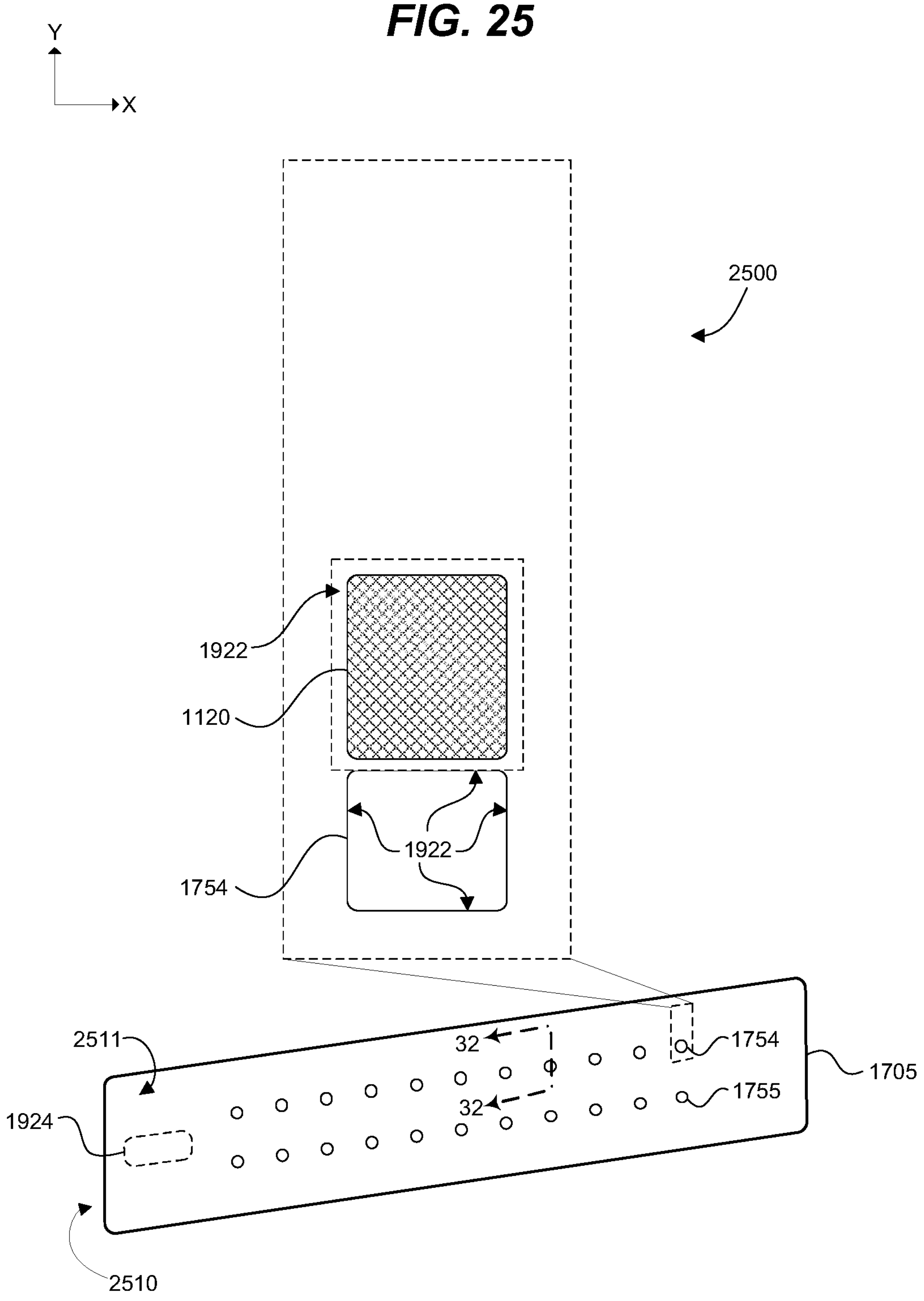
FIG. 25 is a perspective view of a chamber plate in an illustrative embodiment.

FIG. 25 is a perspective view of a chamber plate 1705 in an illustrative embodiment. As described above, chamber plate 1705 is a substantially flat metal substrate 704, and thus has opposing surfaces 2510-2511. Surface 2510 faces toward the discharge surface 220 of the printhead 104, while surface 2511 faces toward housing 230. Magnification window 2500 illustrates a magnified view of chamber plate 1705. Chamber plate 1705 includes a chamber opening 1754 that forms at least part of a pressure chamber 412, and includes a hole surface that represents an inner wall surface 1922. A portion of surface 2511 (between chamber opening 1754 and a longitudinal side of chamber plate 1705) forms a wall of a jetting channel 402, and also represents an inner wall surface 1922. A laser treatment 1000 may be applied to the inner wall surfaces 1922 of chamber plate 1705 to define one or more wetting regions 1120 on the inner wall surfaces 1922. FIG. 25 further illustrates one or more bonding surfaces 1924 on chamber plate 1705. A laser treatment 1000 may be applied to the bonding surfaces 1924 (on one or both of surfaces 2510-2511) of chamber plate 1705 to define one or more adhesion regions 1940 on the bonding surfaces 1924.

Figure 32:
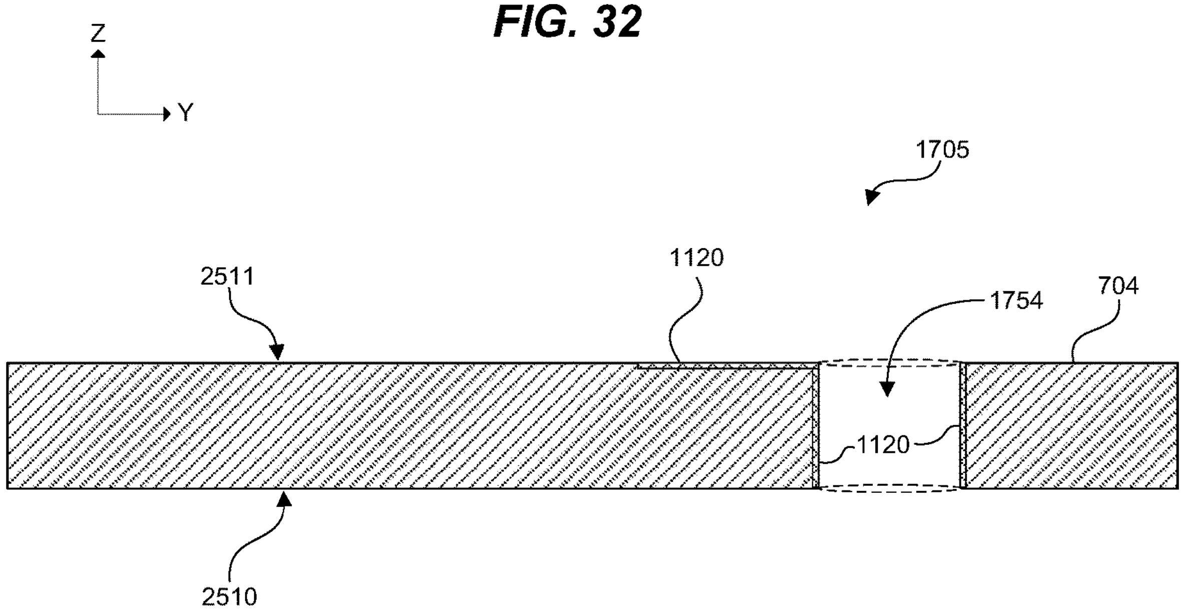
FIG. 32 is a cross-sectional view of a chamber plate in an illustrative embodiment.

FIG. 32 is a cross-sectional view of chamber plate 1705 in an illustrative embodiment. FIG. 32 shows a cross-section along cut-plane 32-32 in FIG. 25. A laser-altered surface texture 1008 may be formed directly on one or more of the inner wall surfaces 1922 of the chamber plate 1705 via a laser treatment 1000 to define one or more wetting regions 1120.

Figure 26:
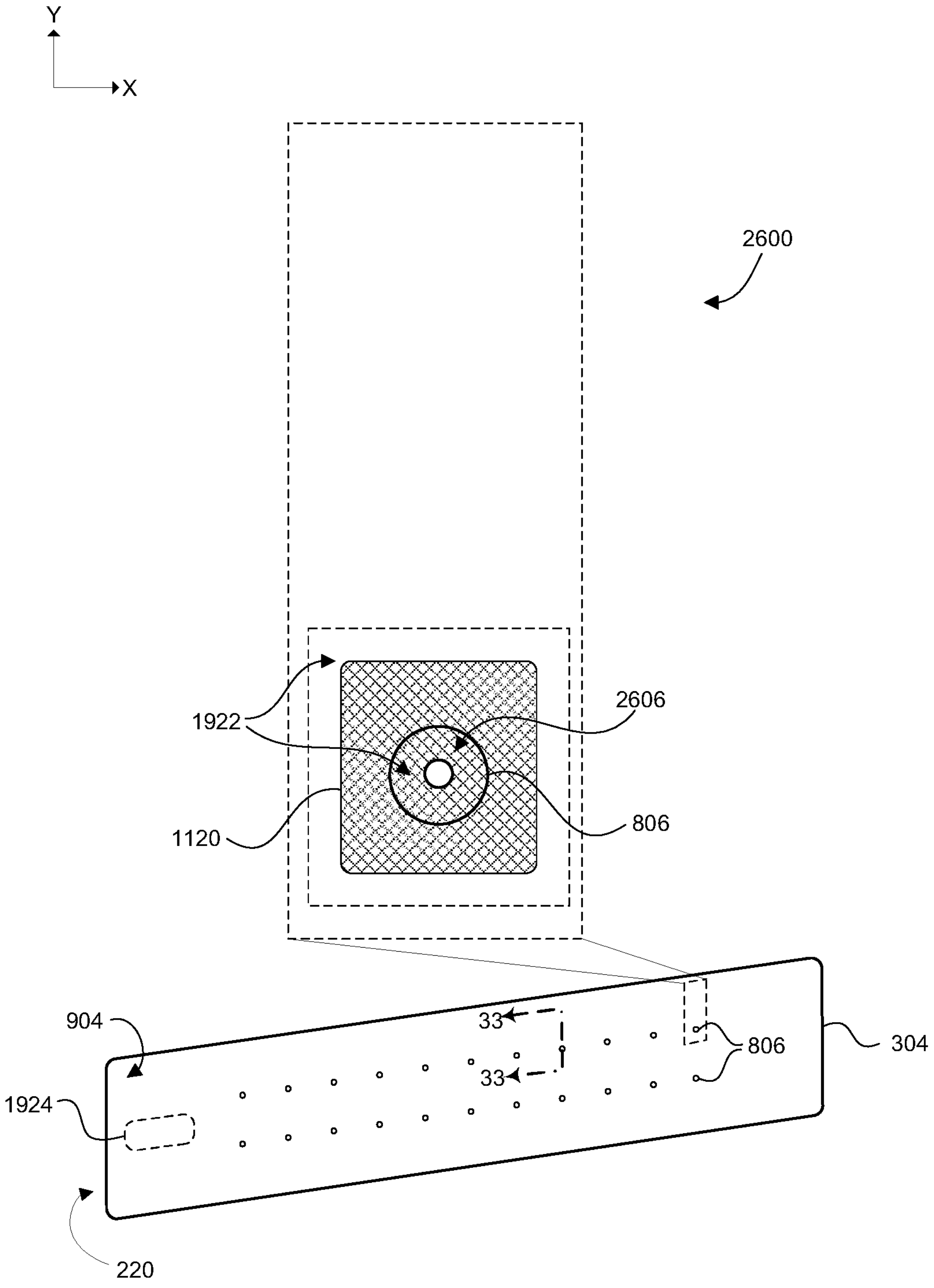
FIG. 26 is a perspective view of a nozzle plate in an illustrative embodiment.

FIG. 26 is a perspective view of a nozzle plate 304 in an illustrative embodiment. As described above, nozzle plate 304 is a substantially flat metal substrate 704, and has a discharge surface 220 and an opposing interface surface 904. Magnification window 2600 illustrates a magnified view of nozzle plate 304. Nozzle plate 304 includes a nozzle hole 806 that forms at least part of a nozzle 306 of a jetting channel 402, and includes a nozzle inner wall 2606 that represents an inner wall surface 1922. A portion of interface surface 904 around nozzle hole 806 forms a wall of a jetting channel 402, and also represents an inner wall surface 1922. A laser treatment 1000 may be applied to the inner wall surfaces 1922 of nozzle plate 304 to define one or more wetting regions 1120 on the inner wall surfaces 1922. FIG.

26 further illustrates one or more bonding surfaces 1924 on nozzle plate 304. A laser treatment 1000 may be applied to the bonding surfaces 1924 (on interface surface 904) of nozzle plate 304 to define one or more adhesion regions 1940 on the bonding surfaces 1924.

Figure 33A:
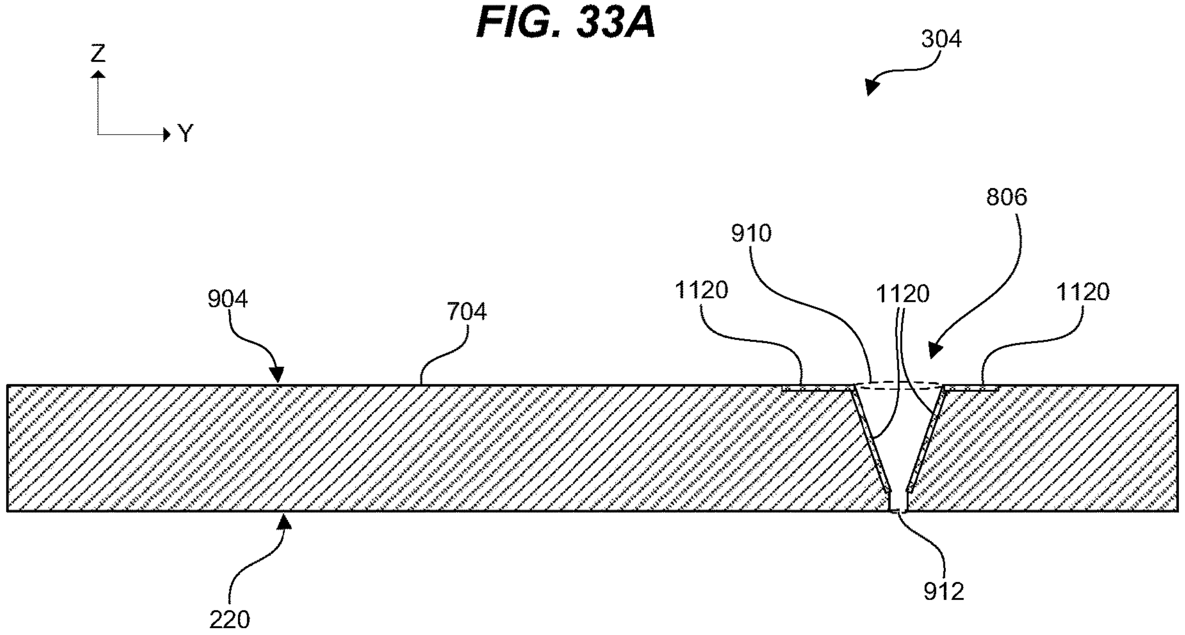
FIG. 33A is a cross-sectional view of a nozzle plate in an illustrative embodiment.

FIG. 33A is a cross-sectional view of nozzle plate 304 in an illustrative embodiment. FIG. 33A shows a cross-section along cut-plane 33-33 in FIG. 26. A laser-altered surface texture 1008 may be formed directly on one or more of the inner wall surfaces 1922 of the nozzle plate 304 via a laser treatment 1000 to define one or more wetting regions 1120.

Figure 33B:
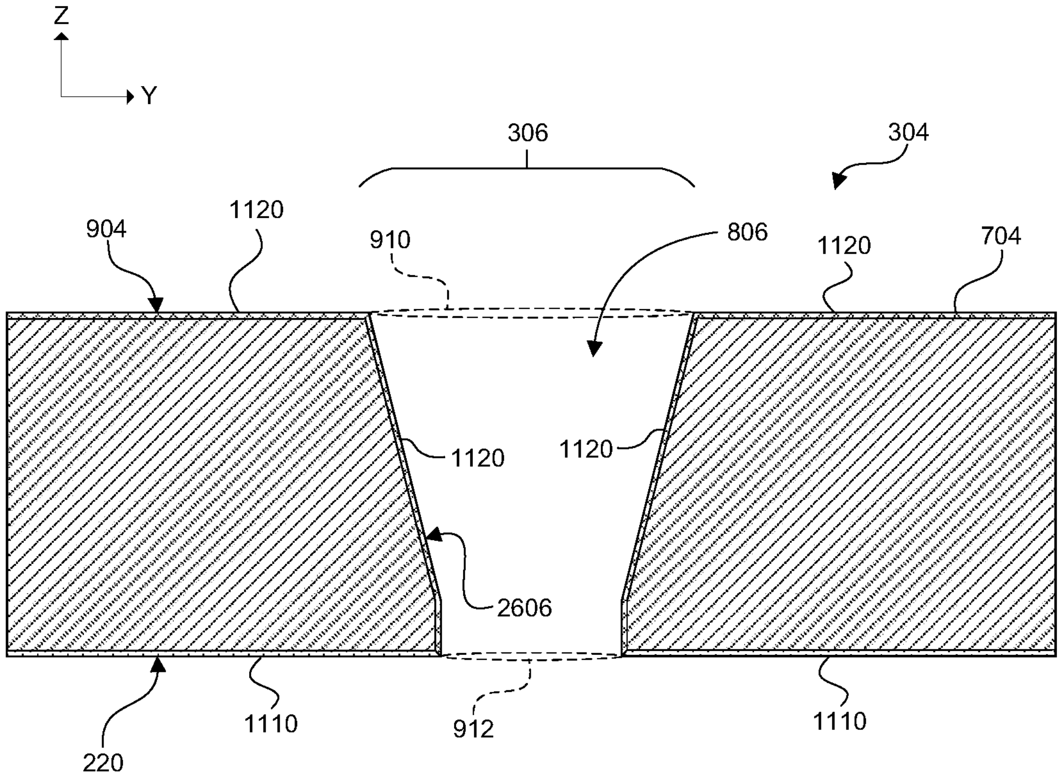
FIG. 33B is a magnified, cross-sectional view of a nozzle plate in an illustrative embodiment.

FIG. 33B is a magnified, cross-sectional view of nozzle plate 304 in an illustrative embodiment. As described above, nozzle inner wall 2606 of nozzle hole 806 represents an inner wall surface 1922, and a laser treatment 1000 may be applied to nozzle inner wall 2606 to define a wetting region 1120 on nozzle inner wall 2606. In an embodiment, the wetting region 1120 may be disposed along the entire length of nozzle inner wall 2606 (in the z-direction) between nozzle discharge orifice 912 and mouth 910. In an embodiment, the wetting region 1120 may be disposed along a portion of the length of nozzle inner wall 2606 (in the z-direction) between nozzle discharge orifice 912 and mouth 910 beginning at the nozzle discharge orifice 912. In an embodiment, the wetting region 1120 may be disposed on a portion of interface surface 904 around the mouth 910 of the nozzle hole 806 (i.e., the portion that forms a wall of a jetting channel 402). The meniscus, which is a curved surface of print fluid at the nozzle discharge orifice 912, is defined in part by the surface tension of the print fluid and nozzle inner wall 2606. To achieve a desired shape of the meniscus, the wetting region 1120 may begin on nozzle inner wall 2606 at the nozzle discharge orifice 912, and extend along nozzle inner wall 2606 toward mouth 910 along a portion of the length or entire length of nozzle inner wall 2606. The wetting region 1120 may also extend around the mouth 910 of nozzle holes 806 along at least a portion of interface surface 904.

As described above, such as in FIGS. 12A-12C, a non-wetting region 1110 may be formed on the discharge surface 220 of the nozzle plate 304. Thus, the discharge surface 220 of the nozzle plate 304 may have one laser-altered surface texture 1008 that defines a non-wetting region 1110 around the nozzle discharge orifice 912, while the nozzle inner wall 2606 has a different laser-altered surface texture 1008 that defines a wetting region 1120 within the nozzle hole 806. Thus, one laser-altered surface texture 1008 of a non-wetting region 1110 along the discharge surface 220 may transition to another laser-altered surface texture 1008 of a wetting region 1120 along the nozzle inner walls 2606, where the transition occurs at the nozzle discharge orifices 912.

One technical benefit of applying wetting regions 1120 to inner wall surfaces 1922 of printhead 104 is improved jetting characteristics. As an example pertaining to nozzle plate 304, the breakup time of a droplet exiting a nozzle 306 and droplet velocity may change based on the wettability of the nozzle inner wall 2606. When a nozzle inner wall 2606 is more hydrophobic and has less adhesion to the print fluid, the droplet head flies further before droplet breakup. This generates a long tail or filament, which may increase the probability of satellites forming of a medium, and may also slow droplet velocity. When a nozzle inner wall 2606 is more hydrophilic and has more adhesion to the print fluid, the meniscus is generally concave and droplet breakup occurs earlier. This generates a shorter, thicker filament, and the droplet can achieve a higher velocity. Thus, applying wetting regions 1120 to nozzle inner wall 2606 (and other surfaces) via laser treatment 1000 can improve performance.

FIGS. 34A-34D are flow charts illustrating methods of fabricating a printhead in illustrative embodiments. The steps of the flow charts described herein are not all inclusive and may include other steps not shown, and the steps may be performed in an alternative order.

Figure 34A:
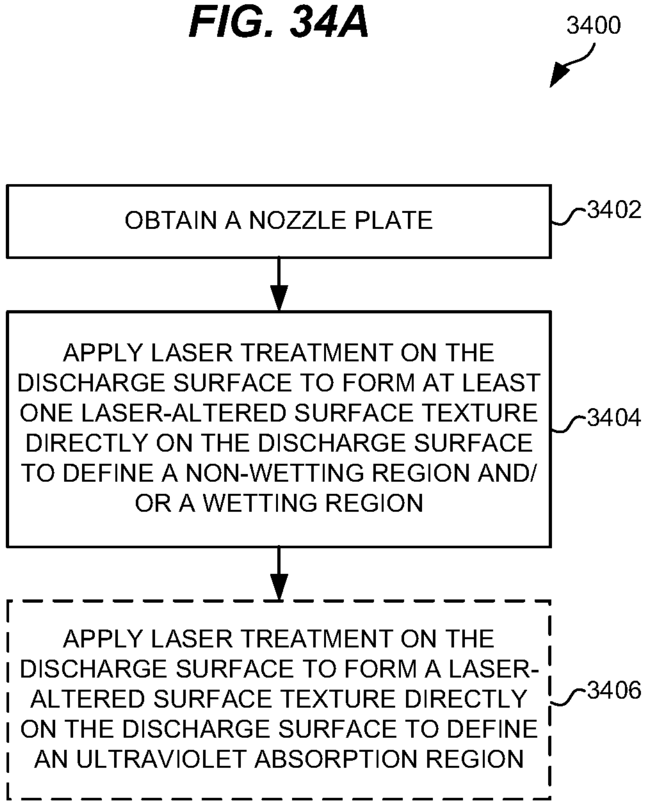
FIGS. 34A-34D are flow charts illustrating methods of fabricating a printhead in illustrative embodiments.

In FIG. 34A, method 3400 comprises obtaining a nozzle plate 304 of a printhead 104 (step 3402), such as described above. In one example, the nozzle plate 304 may be bonded to other plates to form a plate stack 232 of an assembled printhead 104. In another example, the nozzle plate 304 may be obtained before assembly of the printhead 104. In either case, the discharge surface 220 of the nozzle plate 304 represents an external surface 1420 of a printhead 104 (when assembled). Method 3400 further comprises applying a laser treatment 1000 on the discharge surface 220 to form at least one laser-altered surface texture 1008 directly on the discharge surface 220 of the metal substrate 704 to define a non-wetting region 1110 and/or a wetting region 1120 on the discharge surface 220 (step 3404). In an embodiment, method 3400 may further comprise applying the laser treatment 1000 on the discharge surface 220 to form a laser-altered surface texture 1008 directly on the discharge surface 220 to define a UV absorption region 1430 on the discharge surface 220 (optional step 3406). The 2D layouts 1200 of the non-wetting region 1110, wetting region 1120, and/or UV absorption region 1430 on the discharge surface 220 may vary as described above. One technical benefit is the laser treatment 1000 alters the actual material surface of the nozzle plate 304 in defining the non-wetting regions 1110 and/or the wetting regions 1120, so these regions are not as susceptible to wear or degradation as compared to coatings and the like.

Figure 34B:
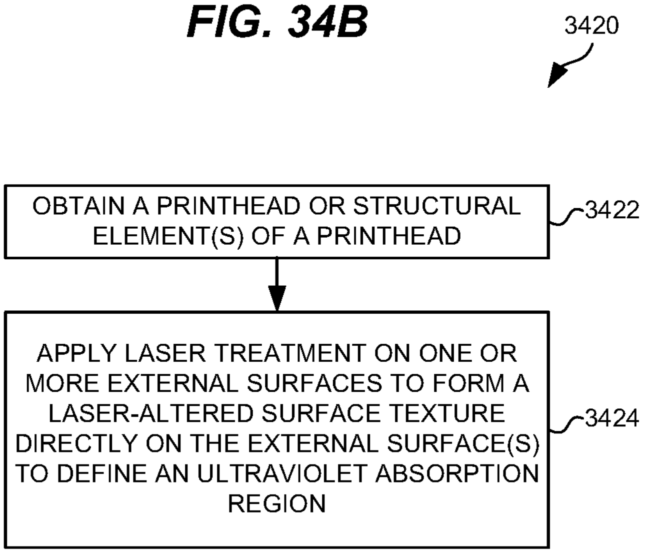

In FIG. 34B, method 3420 comprises obtaining a printhead 104 or one or more structural elements 1400 of an unassembled printhead 104 (step 3422), such as a nozzle plate 304, a housing 230, etc. The printhead 104 or the structural element(s) 1400 comprise one or more external surfaces 1420. Method 3420 further comprises applying a laser treatment 1000 on one or more of the external surfaces 1420 to form a laser-altered surface texture 1008 directly on the external surface(s) 1420 to define a UV absorption region 1430 on the external surface(s) 1420 (step 3424). The 2D layouts 1200 of the UV absorption region 1430 on the external surfaces 1420 may vary as described above. One technical benefit of forming a UV absorption region(s) 1430 on an external surface 1420 of printhead 104 is the UV absorption region(s) 1430 absorb stray UV light, and reduce drying of the UV-curable ink on the discharge surface 220.

Figure 34C:
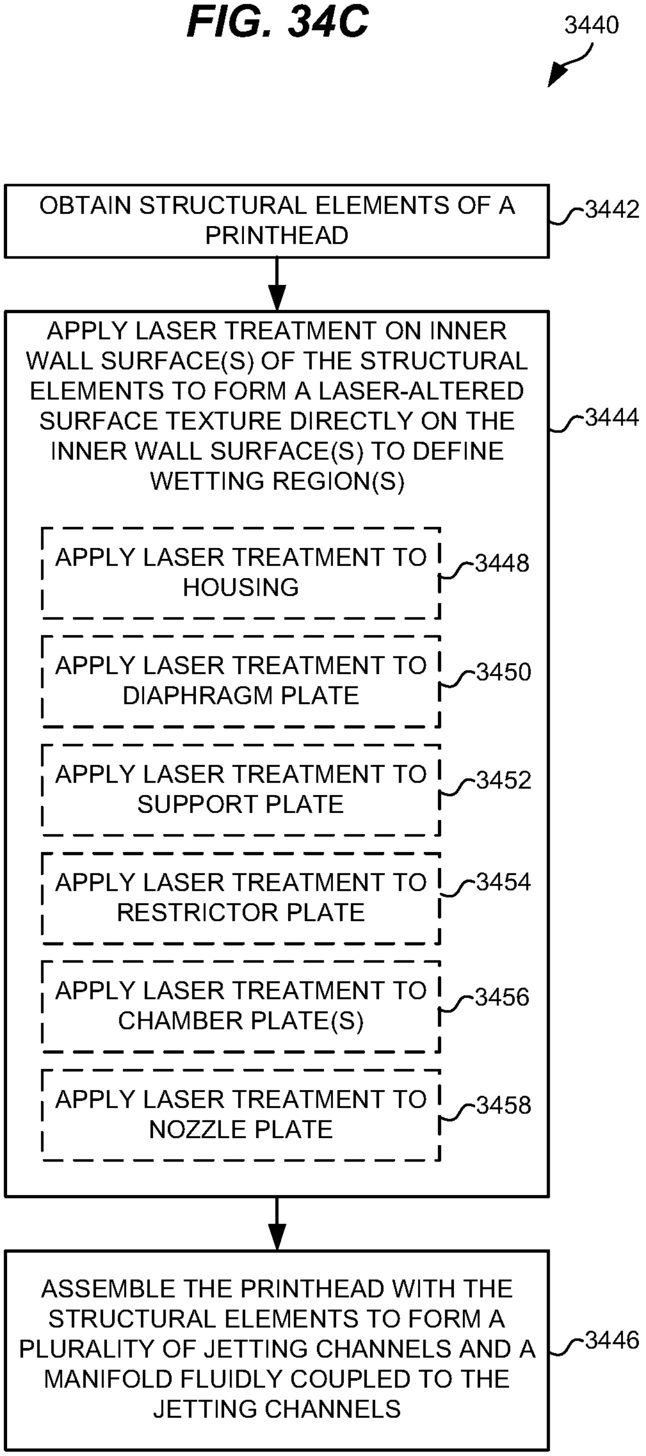

In FIG. 34C, method 3440 comprises obtaining structural elements 1900 of a printhead 104 (step 3442). For example, a structural element 1900 may comprise one or more plates 1932 forming a plate stack 232 of printhead 104, a housing 230 of printhead 104, etc. Method 3440 further comprises applying a laser treatment 1000 to one or more of the structural elements 1900 to form a laser-altered surface texture 1008 directly on one or more inner wall surfaces 1922 of the structural element(s) 1900 to define a wetting region 1120 on the inner wall surfaces 1922 (step 3444). For example, laser treatment 1000 may be applied to inner wall surfaces 1922 of a housing 230 (optional step 3448), such as described in FIG. 20. Laser treatment 1000 may be applied to inner wall surfaces 1922 of a diaphragm plate 1701 (optional step 3450), such as described in FIG. 21. Laser treatment 1000 may be applied to inner wall surfaces 1922 of a support plate 1702 (optional step 3452), such as described in FIG. 22. Laser treatment 1000 may be applied to inner wall surfaces 1922 of a restrictor plate 1703

(optional step 3454), such as described in FIG. 23. Laser treatment 1000 may be applied to inner wall surfaces 1922 of a chamber plate 1704-1705 (optional step 3456), such as described in FIGS. 24-25. Laser treatment 1000 may be applied to inner wall surfaces 1922 of a nozzle plate 304 (optional step 3458), such as described in FIG. 26.

Method 3440 further comprises assembling the printhead 104 with the structural elements 1900 to form a plurality of jetting channels 402 and a manifold 418 fluidly coupled to the jetting channels 402 (step 3446). When the printhead 104 is assembled, the jetting channels 402 and the manifold 418 have internal surfaces 1620 internal to the printhead 104 that correspond with the inner wall surfaces 1922 of the structural elements 1900. The laser-altered surface texture 1008 formed on the inner wall surfaces 1922 defines one or more wetting regions 1120 on the internal surface(s) 1620. One technical benefit is jetting characteristics of the printhead 104 may be improved.

Figure 34D:
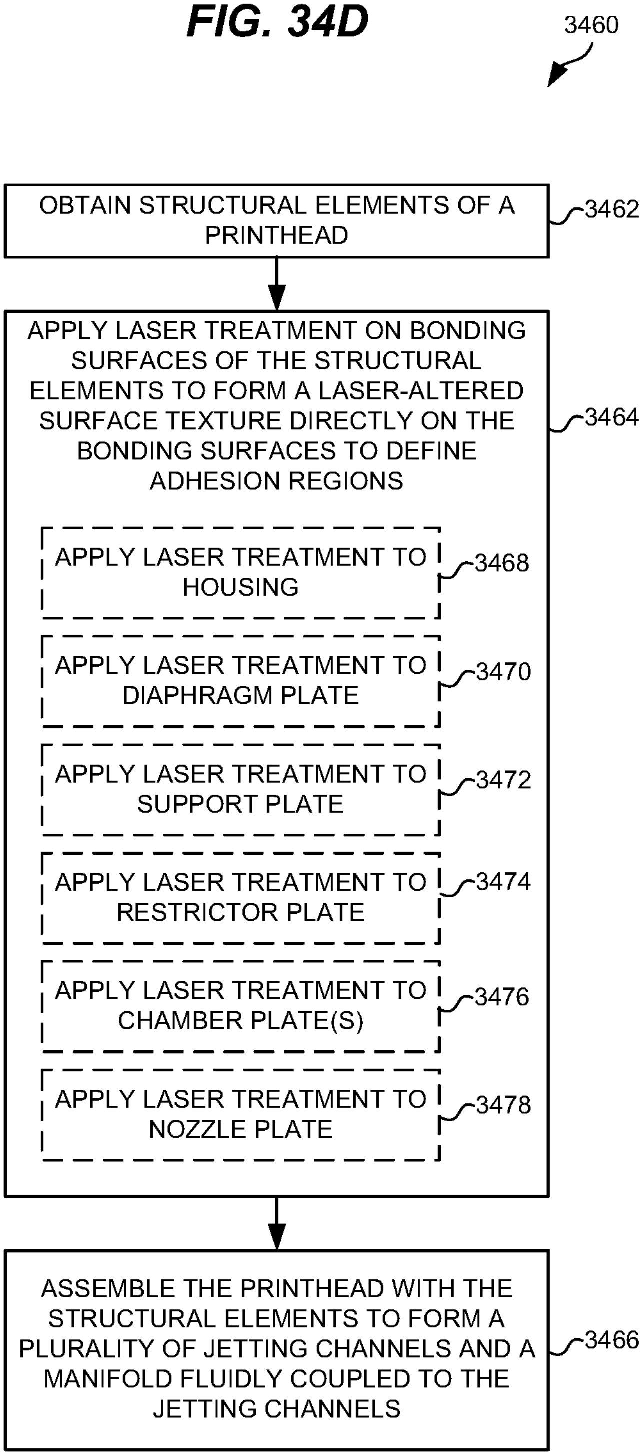

In FIG. 34D, method 3460 comprises obtaining structural elements 1900 of a printhead 104 (step 3462). For example, a structural element 1900 may comprise one or more plates 1932 forming a plate stack 232 of printhead 104, a housing 230 of printhead 104, etc. Method 3460 further comprises applying a laser treatment 1000 to one or more of the structural elements 1900 to form a laser-altered surface texture 1008 directly on one or more bonding surfaces 1924 of the structural element(s) 1900 to define an adhesion region 1940 on the bonding surfaces 1924 (step 3464). For example, laser treatment 1000 may be applied to bonding surfaces 1924 of a housing 230 (optional step 3468), such as described in FIG. 20. Laser treatment 1000 may be applied to bonding surfaces 1924 of a diaphragm plate 1701 (optional step 3470), such as described in FIG. 21. Laser treatment 1000 may be applied to bonding surfaces 1924 of a support plate 1702 (optional step 3472), such as described in FIG. 22. Laser treatment 1000 may be applied to bonding surfaces 1924 of a restrictor plate 1703 (optional step 3474), such as described in FIG. 23. Laser treatment 1000 may be applied to bonding surfaces 1924 of a chamber plate 1704-1705 (optional step 3476), such as described in FIGS. 24-25. Laser treatment 1000 may be applied to bonding surfaces 1924 of a nozzle plate 304 (optional step 3478), such as described in FIG. 26. One technical benefit is the bond strength may be improved between structural elements 1900.

Method 3460 further comprises assembling the printhead 104 with the structural elements 1900 (step 3466). When the printhead 104 is assembled, an adhesive or other type of bonding solution or agent may be applied to the bonding surfaces 1924, such as an epoxy, a silicon, a solder, etc. One technical benefit is the bond strength may be improved between structural elements 1900 due to the adhesion regions 1940 formed on the bonding surfaces 1924.

One or more of the methods described above may be combined in the fabrication of a printhead 104.

Figure 35:
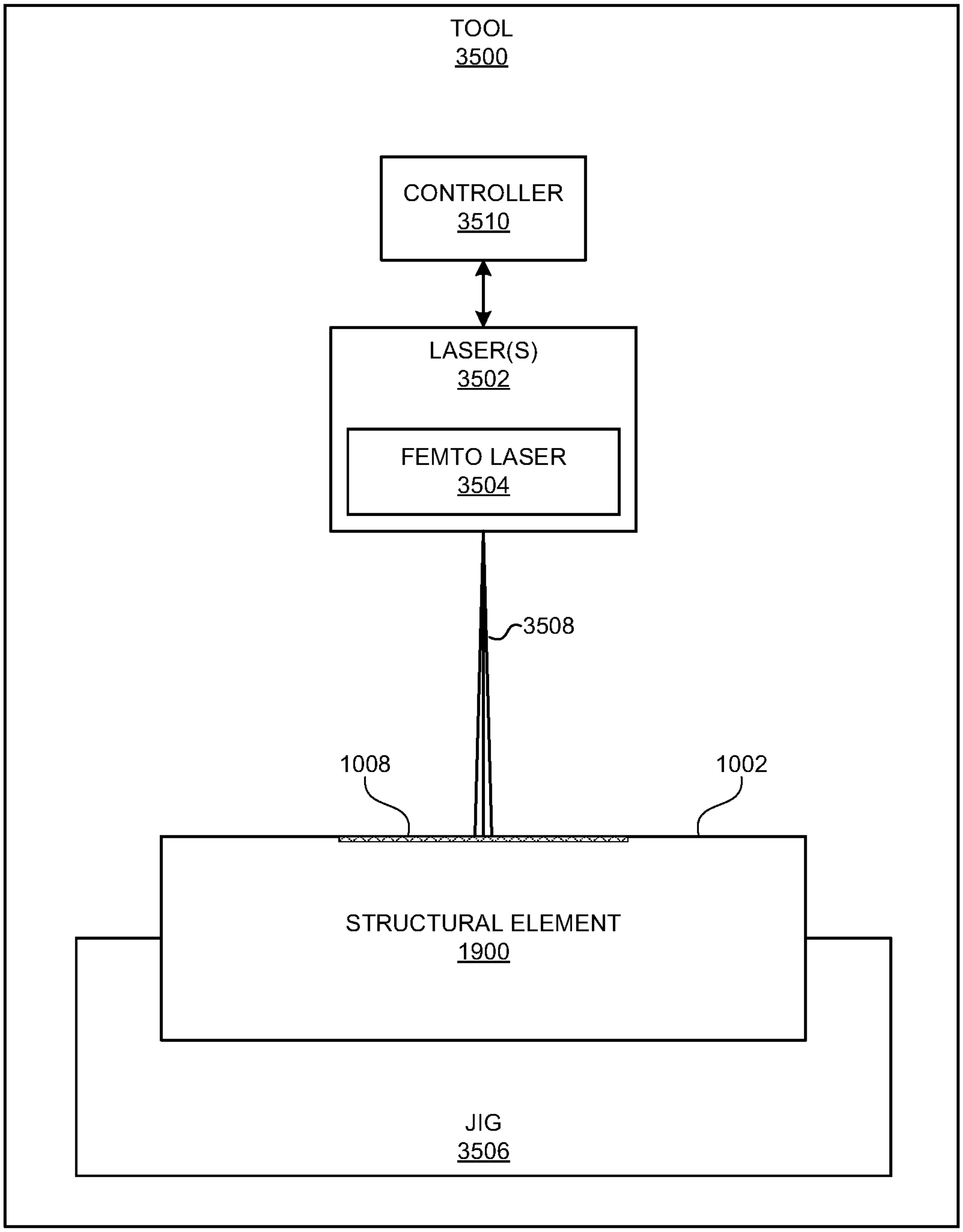
FIG. 35 is a schematic diagram of a fabrication tool for a printhead in an illustrative embodiment.

FIG. 35 is a schematic diagram of a fabrication tool 3500 for a printhead 104 in an illustrative embodiment. Fabrication tool 3500 is an apparatus or device configured to assist in the design and/or fabrication of a printhead, such as printhead 104. More particularly, fabrication tool 3500 is configured to apply laser treatment 1000 to one or more structural elements 1900 of a printhead 104. Fabrication tool 3500 comprises one or more lasers 3502, and a jig 3506 configured to support or hold a structural element 1900 of a printhead 104, such as a housing 230, one or more plates 1932, and/or an assembled printhead 104. A laser 3502 (e.g., a femto or femtosecond laser 3504) is configured to emit one or more laser beams 3508 that irradiate at least a portion of a surface 1002 of the structural element 1900. Jig 3506 is configured to support the structural element 1900 with the surface 1002 being altered facing toward the laser 3502. The laser beams 3508 ablate, alter, or modify the surface 1002, which changes the surface properties of surface 1002 to create a laser-altered surface texture 1008 directly on the surface 1002.

Fabrication tool 3500 further comprises a controller 3510, which is an information processing apparatus configured to control the laser 3502 and/or the jig 3506. Controller 3510 may selectively control the laser 3502 to apply a laser treatment 1000 on the surface 1002 to form a desired laser-altered surface texture 1008. For example, controller 3510 may control laser 3502 to apply a laser treatment 1000 to increase or change the hydrophobic properties of surface 1002, to increase or change the hydrophilic properties of surface 1002, and/or to change or alter other properties of surface 1002 as described above. Controller 3510 may adjust operating parameters of the laser 3502 (e.g., energy or power, number of pulses or scans, pulse duration, beam size, laser frequency, scanning speed, number of scan iterations, etc.) to selectively alter surface material from specific areas, and create desired 3D patterns on surface 1002. One technical benefit is fabrication tool 3500 is able to apply laser-altered surface textures 1008 to external or internal surfaces of a printhead 104 to improve the performance of the printhead 104.

Figure 36:
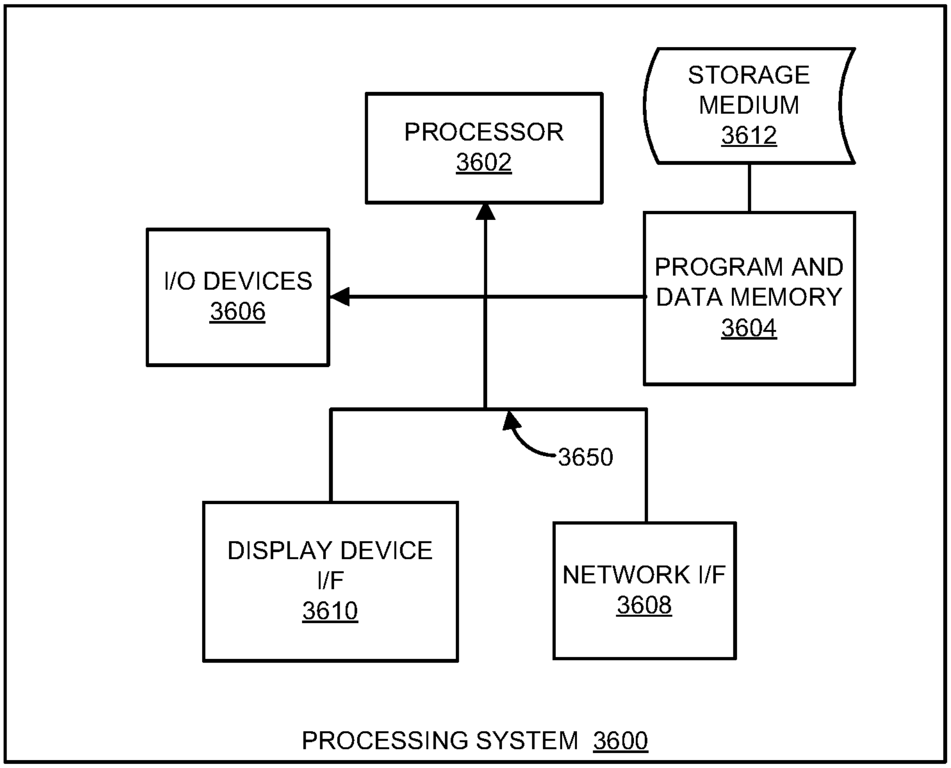
FIG. 36 illustrates a processing system operable to execute a computer readable medium embodying programmed instructions to perform desired functions in an illustrative embodiment.

Embodiments disclosed herein can take the form of software, hardware, firmware, or various combinations thereof. In one particular embodiment, software is used to direct a processing system of fabrication tool 3500 to perform the various operations disclosed herein. FIG. 36 illustrates a processing system 3600 operable to execute a computer readable medium embodying programmed instructions to perform desired functions in an illustrative embodiment. Processing system 3600 is operable to perform the above operations by executing programmed instructions tangibly embodied on computer readable storage medium 3612. In this regard, embodiments can take the form of a computer program accessible via computer-readable medium 3612 providing program code for use by a computer or any other instruction execution system. For the purposes of this description, computer readable storage medium 3612 can be anything that can contain or store the program for use by the computer.

Computer readable storage medium 3612 can be an electronic, magnetic, optical, electromagnetic, infrared, or semiconductor device. Examples of computer readable storage medium 3612 include a solid-state memory, a magnetic tape, a removable computer diskette, a random access memory (RAM), a read-only memory (ROM), a rigid magnetic disk, and an optical disk. Current examples of optical disks include compact disk—read only memory (CD-ROM), compact disk—read/write (CD-R/W), and DVD.

Processing system 3600, being suitable for storing and/or executing the program code, includes at least one processor 3602 coupled to program and data memory 3604 through a system bus 3650. Program and data memory 3604 can include local memory employed during actual execution of the program code, bulk storage, and cache memories that provide temporary storage of at least some program code and/or data in order to reduce the number of times the code and/or data are retrieved from bulk storage during execution.

Input/output or I/O devices 3606 (including but not limited to keyboards, displays, pointing devices, etc.) can be coupled either directly or through intervening I/O controllers. Network adapter interfaces 3608 may also be integrated with the system to enable processing system 3600 to become coupled to other data processing systems or storage devices through intervening private or public networks. Modems, cable modems, IBM Channel attachments, SCSI, Fibre Channel, and Ethernet cards are just a few of the currently available types of network or host interface adapters. Display device interface 3610 may be integrated with the system to interface to one or more display devices, such as printing systems and screens for presentation of data generated by processor 3602.

The following clauses and/or examples pertain to further embodiments or examples. Specifics in the examples may be used anywhere in one or more embodiments. The various features of the different embodiments or examples may be variously combined with some features included and others excluded to suit a variety of different applications. Examples may include subject matter such as a method, means for performing acts of the method, at least one machine-readable medium including instructions that, when performed by a machine cause the machine to perform acts of the method, or of an apparatus or system according to embodiments and examples described herein.

Some embodiments pertain to Example 1 that includes a printhead comprising an assembly of structural elements each comprising a metal substrate, wherein the structural elements form a plurality of jetting channels and a manifold fluidly coupled to the jetting channels, and wherein the jetting channels and the manifold have internal surfaces internal to the printhead configured to contact a print fluid. The printhead comprises a laser-altered surface texture formed directly on one or more of the internal surfaces via a laser treatment to define one or more wetting regions on the one or more of the internal surfaces.

Example 2 includes the subject matter of Example 1, where the structural elements comprise a housing and a plate stack, and the laser-altered surface texture is formed directly on the one or more of the internal surfaces of at least one of the housing and the plate stack.

Example 3 includes the subject matter of Examples 1 and 2, where the housing comprises a manifold duct that forms the manifold, and the laser-altered surface texture is formed directly on an inner wall surface of the manifold duct.

Example 4 includes the subject matter of Examples 1-3, where the plate stack includes a nozzle plate comprising a plurality of nozzle holes disposed through the nozzle plate from a first surface to an opposing second surface to define nozzles of the jetting channels, wherein the nozzle holes at the second surface define nozzle discharge orifices of the nozzles. The laser-altered surface texture is formed directly on one or more inner wall surfaces of the nozzle plate.

Example 5 includes the subject matter of Examples 1-4, where the laser-altered surface texture is formed directly on an inner wall surface of a nozzle inner wall of the nozzle holes.

Example 6 includes the subject matter of Example 1-5, where the laser-altered surface texture defines a wetting region along at least a portion of a length of the nozzle inner wall beginning at a nozzle discharge orifice.

Example 7 includes the subject matter of Examples 1-6, where the laser-altered surface texture comprises a first laser-altered surface texture formed directly on the one or more inner wall surfaces of the nozzle plate to define the one or more wetting regions. The printhead further comprises a second laser-altered surface texture formed directly on the second surface of the nozzle plate via the laser treatment to define a non-wetting region on the second surface surrounding the nozzle discharge orifices.

Example 8 includes the subject matter of Examples 1-7, where the plate stack includes a chamber plate comprising a plurality of chamber openings disposed through the chamber plate from a first surface to an opposing second surface to define pressure chambers of the jetting channels, and the laser-altered surface texture is formed directly on one or more inner wall surfaces of the chamber plate.

Example 9 includes the subject matter of Examples 1-8, where the plate stack includes a restrictor plate comprising a plurality of restrictor openings, and the laser-altered surface texture is formed directly on one or more inner wall surfaces of the restrictor plate.

Example 10 includes the subject matter of Examples 1-9, where the plate stack includes a support plate comprising a plurality of chamber openings disposed through the support plate from a first surface to an opposing second surface to define pressure chambers of the jetting channels, and a manifold opening disposed through the support plate to define the manifold, and the laser-altered surface texture is formed directly on one or more inner wall surfaces of the support plate.

Example 11 includes the subject matter of Examples 1-10, where the plate stack includes a diaphragm plate that forms diaphragms of the jetting channels. The diaphragm plate includes a first surface configured to contact actuators, and an opposing second surface. The diaphragm plate comprises a manifold opening disposed through the diaphragm plate to define the manifold, and the laser-altered surface texture is formed directly on one or more inner wall surfaces of the diaphragm plate.

Example 12 includes the subject matter of Examples 1-11, where the structural elements comprise one or more bonding surfaces, and the printhead further comprises another laser-altered surface texture formed directly on the one or more bonding surfaces via the laser treatment to define one or more adhesion regions on the one or more bonding surfaces.

Example 13 includes the subject matter of Examples 1-12, where an image forming apparatus comprises the printhead.

Some embodiments pertain to Example 14 that includes a method comprising obtaining structural elements of a printhead each comprising a metal substrate, applying a laser treatment to one or more of the structural elements to form a laser-altered surface texture directly on one or more inner wall surfaces of the one or more of the structural elements, and assembling the printhead with the structural elements to form a plurality of jetting channels and a manifold fluidly coupled to the jetting channels. The jetting channels and the manifold have internal surfaces internal to the printhead that correspond with the inner wall surfaces of the structural elements, and the laser-altered surface texture defines one or more wetting regions on one or more of the internal surfaces configured to contact a print fluid.

Example 15 includes the subject matter of Example 14, where the structural elements comprise a housing and a plurality of plates, and the laser-altered surface texture is formed directly on the one or more of the internal surfaces of at least one of the housing and the plates.

Example 16 includes the subject matter of Examples 14 and 15, where the plates include a nozzle plate comprising a plurality of nozzle holes disposed through the nozzle plate from a first surface to an opposing second surface to define nozzles of the jetting channels, wherein the nozzle holes at the second surface define nozzle discharge orifices of the nozzles. The laser-altered surface texture is formed directly on one or more inner wall surfaces of the nozzle plate.

Example 17 includes the subject matter of Examples 14-16, where the laser-altered surface texture is formed directly on an inner wall surface of a nozzle inner wall of the nozzle holes.

Example 18 includes the subject matter of Examples 14-17, where the laser-altered surface texture defines a wetting region along at least a portion of a length of the nozzle inner wall beginning at a nozzle discharge orifice.

Example 19 includes the subject matter of Examples 14-18, where the laser-altered surface texture comprises a first laser-altered surface texture formed directly on the one or more inner wall surfaces of the nozzle plate to define the one or more wetting regions, and the method further comprises applying the laser treatment to form a second laser-altered surface texture directly on the second surface of the nozzle plate to define a non-wetting region on the second surface surrounding the nozzle discharge orifices.

Some embodiments pertain to Example 20 that includes a fabrication tool comprising one or more lasers, a jig configured to support a structural element of a printhead comprising a metal substrate, and a controller configured to control the one or more lasers to apply a laser treatment on one or more inner wall surfaces of the structural element to form a laser-altered surface texture directly on the one or more inner wall surfaces to define a wetting region on the one or more inner wall surfaces configured to contact a print fluid.

Although specific embodiments were described herein, the scope of the invention is not limited to those specific embodiments. The scope of the invention is defined by the following claims and any equivalents thereof.

What is claimed is:

1. A printhead, comprising:

an assembly of structural elements each comprising a metal substrate, wherein the structural elements form a plurality of jetting channels and a manifold fluidly coupled to the jetting channels, and wherein the jetting channels and the manifold have internal surfaces internal to the printhead configured to contact a print fluid; and a laser-altered surface texture formed directly on one or more of the internal surfaces via a laser treatment to define one or more wetting regions on the one or more of the internal surfaces.

2. The printhead of claim 1, wherein:

the structural elements comprise a housing and a plate stack; and the laser-altered surface texture is formed directly on the one or more of the internal surfaces of at least one of the housing and the plate stack.

3. The printhead of claim 2, wherein:

the housing comprises a manifold duct that forms the manifold; and the laser-altered surface texture is formed directly on an inner wall surface of the manifold duct.

4. The printhead of claim 2, wherein:

the plate stack includes a nozzle plate comprising a plurality of nozzle holes disposed through the nozzle plate from a first surface to an opposing second surface to define nozzles of the jetting channels, wherein the nozzle holes at the second surface define nozzle discharge orifices of the nozzles; and the laser-altered surface texture is formed directly on one or more inner wall surfaces of the nozzle plate.

5. The printhead of claim 4, wherein:

the laser-altered surface texture is formed directly on an inner wall surface of a nozzle inner wall of the nozzle holes.

6. The printhead of claim 5, wherein:

the laser-altered surface texture defines a wetting region along at least a portion of a length of the nozzle inner wall beginning at a nozzle discharge orifice.

7. The printhead of claim 4, wherein:

the laser-altered surface texture comprises a first laser-altered surface texture formed directly on the one or more inner wall surfaces of the nozzle plate to define the one or more wetting regions; and the printhead further comprises a second laser-altered surface texture formed directly on the second surface of the nozzle plate via the laser treatment to define a non-wetting region on the second surface surrounding the nozzle discharge orifices.

8. The printhead of claim 2, wherein:

the plate stack includes a chamber plate comprising a plurality of chamber openings disposed through the chamber plate from a first surface to an opposing second surface to define pressure chambers of the jetting channels; and the laser-altered surface texture is formed directly on one or more inner wall surfaces of the chamber plate.

9. The printhead of claim 2, wherein:

the plate stack includes a restrictor plate comprising a plurality of restrictor openings; and the laser-altered surface texture is formed directly on one or more inner wall surfaces of the restrictor plate.

10. The printhead of claim 2, wherein:

the plate stack includes a support plate comprising a plurality of chamber openings disposed through the support plate from a first surface to an opposing second surface to define pressure chambers of the jetting channels, and a manifold opening disposed through the support plate to define the manifold; and the laser-altered surface texture is formed directly on one or more inner wall surfaces of the support plate.

11. The printhead of claim 2, wherein:

the plate stack includes a diaphragm plate that forms diaphragms of the jetting channels;

the diaphragm plate includes a first surface configured to contact actuators, and an opposing second surface;

the diaphragm plate comprises a manifold opening disposed through the diaphragm plate to define the manifold; and the laser-altered surface texture is formed directly on one or more inner wall surfaces of the diaphragm plate.

12. The printhead of claim 1, wherein:

the structural elements comprise one or more bonding surfaces; and the printhead further comprises another laser-altered surface texture formed directly on the one or more bonding surfaces via the laser treatment to define one or more adhesion regions on the one or more bonding surfaces.

13. An image forming apparatus, comprising:

the printhead of claim 1.

14. A printhead, comprising:

a metal housing; and a plate stack bonded to the metal housing, the plate stack comprising a series of metal plates bonded to one another, wherein the housing and the plate stack form a plurality of jetting channels and a common manifold fluidly coupled to the jetting channels, having internal surfaces internal to the printhead configured to contact a print fluid; and a laser-altered surface texture formed directly on one or more of the internal surfaces of the jetting channels and the common manifold via a laser treatment to define one or more wetting regions on the one or more of the internal surfaces.

15. The printhead of claim 14, wherein:

the metal housing comprises a manifold duct that forms the common manifold; and the laser-altered surface texture is formed directly on an inner wall surface of the manifold duct.

16. The printhead of claim 14, wherein the metal plates comprise:

a diaphragm plate that forms diaphragms of the jetting channels;

a support plate;

a restrictor plate;

a first chamber plate and a second chamber plate that form pressure chambers of the jetting channels; and a nozzle plate having nozzle holes that define nozzles of the jetting channels;

wherein the laser-altered surface texture is formed directly on an inner wall surface of one or more of the metal plates.

17. The printhead of claim 16, wherein:

the first chamber plate and the second chamber plate each comprises a plurality of chamber openings disposed from a first surface to an opposing second surface to form the pressure chambers;

the restrictor plate comprises a plurality of restrictor openings;

the support plate comprises a plurality of chamber openings disposed through the support plate from a first surface to an opposing second surface to define the pressure chambers, and a manifold opening disposed through the support plate to define the common manifold;

the diaphragm plate comprises a first surface configured to contact actuators, and an opposing second surface; and the laser-altered surface texture is formed directly on one or more inner wall surfaces of at least one of the first chamber plate and the second chamber plate, is formed directly on one or more inner wall surfaces of the restrictor plate, is formed directly on one or more inner wall surfaces of the support plate, and is formed directly on at least the second surface of the diaphragm plate.

18. The printhead of claim 14, wherein:

the metal housing and the metal plates comprise one or more bonding surfaces; and the printhead further comprises another laser-altered surface texture formed directly on the one or more bonding surfaces via the laser treatment to define one or more adhesion regions on the one or more bonding surfaces.

19. An image forming apparatus, comprising:

the printhead of claim 14.

* * * * *